US012573177B2

(12) United States Patent
Kawai et al.

(10) Patent No.: US 12,573,177 B2
(45) Date of Patent: Mar. 10, 2026

(54) IMAGE PROCESSING APPARATUS, IMAGE PROCESSING METHOD, AND NON-TRANSITORY STORAGE MEDIUM

(71) Applicant: NEC Corporation, Tokyo (JP)

(72) Inventors: Ryo Kawai, Tokyo (JP); Noboru Yoshida, Tokyo (JP); Yadong Pan, Tokyo (JP); Shoji Nishimura, Tokyo (JP); Jianquan Liu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 442 days.

(21) Appl. No.: 18/009,160

(22) PCT Filed: Jun. 10, 2020

(86) PCT No.: PCT/JP2020/022816

§ 371 (c)(1),
(2) Date: Dec. 8, 2022

(87) PCT Pub. No.: WO2021/250809

PCT Pub. Date: Dec. 16, 2021

(65) Prior Publication Data

US 2023/0215135 A1 Jul. 6, 2023

(51) Int. Cl.

*G06V 10/74* (2022.01)
*G06F 16/535* (2019.01)
(Continued)

(52) U.S. Cl.

CPC .......... *G06V 10/761* (2022.01); *G06F 16/535* (2019.01); *G06F 16/5866* (2019.01); (Continued)

(58) Field of Classification Search

CPC ...... G06V 10/761; G06V 10/86; G06V 40/10; G06V 10/945; G06V 20/50; G06F 16/535; G06F 16/5866
See application file for complete search history.

(56) References Cited

U.S. PATENT DOCUMENTS

2011/0058046 A1 3/2011 Yoshida et al.
2011/0078176 A1 3/2011 Hayaishi
(Continued)

FOREIGN PATENT DOCUMENTS

JP 2006-260405 A 9/2006
JP 2011-070412 A 4/2011
(Continued)

OTHER PUBLICATIONS https://www.thesaurus.com/browse/jumping; archived at Wayback Machine https://web.archive.org/web/20180621233601/https://www.thesaurus.com/browse/jumping; citing a capture dated Jun. 21, 2018 (Year: 2018).*

(Continued)

*Primary Examiner* — Matthew C Bella
*Assistant Examiner* — Jinsu Hwang
(74) *Attorney, Agent, or Firm* — Sughrue Mion, PLLC

(57) ABSTRACT

The present invention provides an image processing apparatus (100) including an image acquisition unit (101) that acquires a query image, based on an input keyword, a skeleton structure detection unit (102) that detects a two-dimensional skeleton structure of a person included in the query image, a feature value computation unit (103) that computes a feature value of the detected two-dimensional skeleton structure, and a search unit (105) that searches, based on a degree of similarity of the computed feature value, for an analysis target image including a person in a state similar to a state of a person included in the query image from the analysis target image.

12 Claims, 46 Drawing Sheets

(51) Int. Cl.
*G06F 16/58* (2019.01)
*G06V 10/86* (2022.01)
*G06V 10/94* (2022.01)
*G06V 20/50* (2022.01)
*G06V 40/10* (2022.01)

(52) U.S. Cl.
CPC ............ *G06V 10/86* (2022.01); *G06V 10/945* (2022.01); *G06V 40/10* (2022.01); *G06V 20/50* (2022.01)

(56) References Cited

U.S. PATENT DOCUMENTS

| | | | | |
|---|---|---|---|---|
| 2013/0028517 | A1 | 1/2013 | Yoo et al. | |
| 2019/0147292 | A1* | 5/2019 | Watanabe ........... | G06F 16/5838 382/103 |
| 2019/0347826 | A1* | 11/2019 | Zhang ...................... | G06N 3/08 |
| 2023/0244713 | A1* | 8/2023 | Kawai ................. | G06F 16/5854 707/758 |

FOREIGN PATENT DOCUMENTS

| | | | |
|---|---|---|---|
| JP | 2011-197892 | A | 10/2011 |
| JP | 2011-210000 | A | 10/2011 |
| JP | 2011-237909 | A | 11/2011 |
| JP | 2014-522035 | A | 8/2014 |
| JP | 2019-091138 | A | 6/2019 |
| WO | 2010/106632 | A1 | 9/2010 |
| WO | 2011/106632 | A1 | 9/2011 |

OTHER PUBLICATIONS

M. A. Al-Hami and R. Lakaemper, "Reconstructing 3D Human Poses from Keyword Based Image Database Query," 2017 International Conference on 3D Vision (3DV), Qingdao, China, 2017, pp. 440-448, doi: 10.1109/3DV.2017.00057. (Year: 2017).*

JP Office Action for JP Application No. 2022-530423, mailed on Oct. 31, 2023 with English Translation.

International Search Report for PCT Application No. PCT/JP2020/022816, mailed on Sep. 1, 2020.

Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, pp. 7291-7299.

Ohsaki, Shinichiro et al., "Query Image Synthesis using Features Extracted from Keywords for Web Image Retrieval". The Journal of the Institute of Image Information and Television Engineers., Nov. 1, 2010, p. 1633, left column, Section 3.4.

* cited by examiner

START

COMPUTE CAMERA
PARAMETER     S231

ADJUST ARRANGEMENT AND
HEIGHT OF THREE-DIMENSIONAL
HUMAN MODEL     S232

FIT THREE-DIMENSIONAL HUMAN
MODEL TO TWO-DIMENSIONAL
SKELETON STRUCTURE     S233

COMPUTE HEIGHT PIXEL NUMBER
OF THREE-DIMENSIONAL HUMAN
MODEL     S234

END

FIG. 41

RELATED WORD DICTIONARY

| STATE OF PERSON | KEYWORD | SUBORDINATE WORD | · · · |
| --- | --- | --- | --- |
| SIT | SIT, SIT DOWN, · · · · | SIT STRAIGHT, SIT CROSS-LEGGED, · · · · · · · | · · · |
| STAND | STAND, STAND UP, · · · · · · · | STAND ON ONE LEG, STAND ON BOTH LEGS, · · · · · · · | · · · |
| · · · | · · · | · · · | · · · |

FIG. 42

IMAGE FOR QUERY

| IMAGE IDENTIFICATION INFORMATION | KEYWORD |
|---|---|
| C0001 | SIT DOWN ,SIT STRAIGHT |
| C0002 | SIT DOWN, SIT CROSS-LEGGED |
| . . . | . . . |

FIG. 43

ANALYSIS TARGET IMAGE

| IMAGE IDENTIFICATION INFORMATION | KEYWORD | · · · |
|---|---|---|
| 000001 | SIT DOWN , SIT STRAIGHT | · · · |
| 000002 | · · · | · · · |
| 000003 | · · · | · · · |
| 000004 | · · · | · · · |
| ⋮ | ⋮ | ⋮ |

IMAGE PROCESSING APPARATUS, IMAGE PROCESSING METHOD, AND NON-TRANSITORY STORAGE MEDIUM

This application is a National Stage Entry of PCT/JP2020/022816 filed on Jun. 10, 2020, the contents of all of which are incorporated herein by reference, in their entirety.

TECHNICAL FIELD

The present invention relates to an image processing apparatus, an image processing method, and a program.

BACKGROUND ART

In recent years, in a surveillance system and the like, a technique of detecting and searching for a state such as a pose and behavior of a person from an image captured by a surveillance camera has been used. For example, Patent Documents 1 and 2 have been known as related techniques. Patent Document 1 discloses a technique of searching for a similar pose of a person, based on a key joint of a head, a hand, a foot, and the like of the person included in a depth video. Patent Document 2 discloses a technique of searching for a similar image by using pose information such as a tilt provided to an image, which is not related to a pose of a person. Note that, in addition, Non-Patent Document 1 has been known as a technique related to skeleton estimation of a person.

Further, Patent Document 3 discloses a technique of acquiring an object image, based on an input keyword, generating a query image being a synthesized image in which the object image is arranged, and thereafter searching for an image similar to the query image.

Further, Patent Document 4 discloses a technique of estimating a pose of each of a plurality of persons included in an image by using pose estimation processing, and extracting a person having a pose similar to a predetermined pose from among the plurality of persons.

Furthermore, Patent Document 5 discloses a technique of performing tag image search based on an accepted query tag, performing similar image search on an image of a result of the tag image search as a query image, collecting a tag being added to an image of a result of the similar image search, determining a tag semantically related to a query tag from among the collected tags, performing tag image search based on the determined tag, and adding a query tag to an image of a result of the tag image search.

RELATED DOCUMENT

Patent Document

[Patent Document 1] Japanese Patent Application Publication (Translation of PCT Application) No. 2014-522035

[Patent Document 2] Japanese Patent Application Publication No. 2006-260405

[Patent Document 3] Japanese Patent Application Publication No. 2011-197892

[Patent Document 4] Japanese Patent Application Publication No. 2019-91138

[Patent Document 5] Japanese Patent Application Publication No. 2011-210000

Non-Patent Document

[Non-Patent Document 1] Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, PP. 7291-7299

DISCLOSURE OF THE INVENTION

Technical Problem

Patent Documents 1 and 4 are techniques for searching for an image including a person in a predetermined state, but there is room for improvement in a method of inputting a search query. Patent Documents 2, 3, and 5 are not techniques for searching for an image including a person in a predetermined state.

An object of the present invention is to achieve a user-friendly means for inputting a search query in a system that searches for an image including a person in a predetermined state.

Solution to Problem

The present invention provides an image processing apparatus including:

an image acquisition unit that acquires a query image, based on an input keyword;

a skeleton structure detection unit that detects a two-dimensional skeleton structure of a person included in the query image;

a feature value computation unit that computes a feature value of the detected two-dimensional skeleton structure; and a search unit that searches, based on a degree of similarity of the computed feature value, for an analysis target image including a person in a state similar to a state of a person included in the query image from the analysis target image.

Further, the present invention provides an image processing method including, by a computer:

acquiring a query image, based on an input keyword;

detecting a two-dimensional skeleton structure of a person included in the query image;

computing a feature value of the detected two-dimensional skeleton structure; and searching, based on a degree of similarity of the computed feature value, for an analysis target image including a person in a state similar to a state of a person included in the query image from the analysis target image.

Further, the present invention provides a program causing a computer to function as:

an image acquisition unit that acquires a query image, based on an input keyword;

a skeleton structure detection unit that detects a two-dimensional skeleton structure of a person included in the query image;

a feature value computation unit that computes a feature value of the detected two-dimensional skeleton structure; and a search unit that searches, based on a degree of similarity of the computed feature value, for an analysis target image including a person in a state similar to a state of a person included in the query image from the analysis target image.

Advantageous Effects of Invention

According to the present invention, a user-friendly means for inputting a search query is achieved in a system that searches for an image including a person in a predetermined state.

BRIEF DESCRIPTION OF THE DRAWINGS

FIG. 41 is a diagram schematically illustrating one example of information processed by the image processing apparatus.

FIG. 42 is a diagram schematically illustrating one example of information processed by the image processing apparatus.

FIG. 43 is a diagram schematically illustrating one example of information processed by the image processing apparatus.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted.

Consideration for Example Embodiment

In recent years, an image recognition technique utilizing machine learning such as deep learning has been applied to various systems. For example, application to a surveillance system for performing surveillance by an image of a surveillance camera has been advanced. By utilizing machine learning in the surveillance system, a state such as a pose and behavior of a person is being recognizable from an image to some extent.

However, in such a related technique, a state of a person desired by a user may not necessarily recognizable on demand. For example, there is a case where a state of a person desired to be searched and recognized by a user can be determined in advance, or there is a case where determination cannot be specifically made as in an unknown state. Then, in some cases, a state of a person desired to be searched by a user cannot be specifically specified. Further, in a case of a configuration in which an image including a state of a person desired to be searched has to be input as a query image, there is a case where a lot of time and effort to prepare the query image is needed. Furthermore, in a case where a part of a body of a person is hidden, a search or the like cannot be performed. In the related technique, a state of a person can be searched only from a specific search condition, and thus it is difficult to flexibly search for and classify a desired state of a person.

The inventors have considered a method of using a skeleton estimation technique such as Non-Patent Document 1 in order to recognize a state of a person desired by a user from an image on demand. Similar to OpenPose disclosed in Non-Patent Document 1, and the like, in the related skeleton estimation technique, a skeleton of a person is estimated by learning image data in which various correct answer patterns are set. In the following example embodiments, a state of a person can be flexibly recognized by utilizing such a skeleton estimation technique.

Note that, a skeleton structure estimated by the skeleton estimation technique such as OpenPose is formed of a "keypoint" being a characteristic point such as a joint and a "bone (bone link)" indicating a link between keypoints. Thus, in the following example embodiments, a skeleton structure will be described by using words "keypoint" and "bone", and "keypoint" is associated with a "joint" of a person and "bone" is associated with a "bone" of a person unless otherwise limited.

Outline of Example Embodiment

Figure 1:
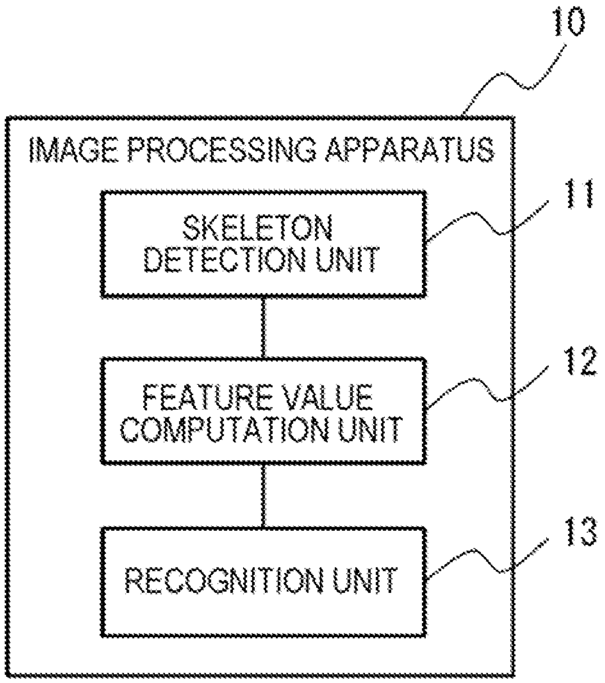
FIG. 1 is a configuration diagram illustrating an outline of an image processing apparatus according to an example embodiment.

FIG. 1 illustrates an outline of an image processing apparatus 10 according to an example embodiment. As illustrated in FIG. 1, the image processing apparatus 10 includes a skeleton detection unit 11, a feature value computation unit 12, and a recognition unit 13. The skeleton detection unit 11 detects two-dimensional skeleton structures (hereinafter, there is a case of simply referring to as a "skeleton structure") of a plurality of persons, based on a two-dimensional image acquired from a camera and the like. The feature value computation unit 12 computes feature values of a plurality of two-dimensional skeleton structures detected by the skeleton detection unit 11. The recognition unit 13 performs recognition processing on a state of the plurality of persons, based on a degree of similarity between the plurality of feature values computed by the feature value computation unit 12. The recognition processing is classification processing, search processing, and the like of a state of a person.

In this way, in the example embodiment, a two-dimensional skeleton structure of a person is detected from a two-dimensional image, and the recognition processing such as classification and search of a state of a person is performed based on a feature value computed from the two-dimensional skeleton structure.

Example Embodiment 1

Figure 2:
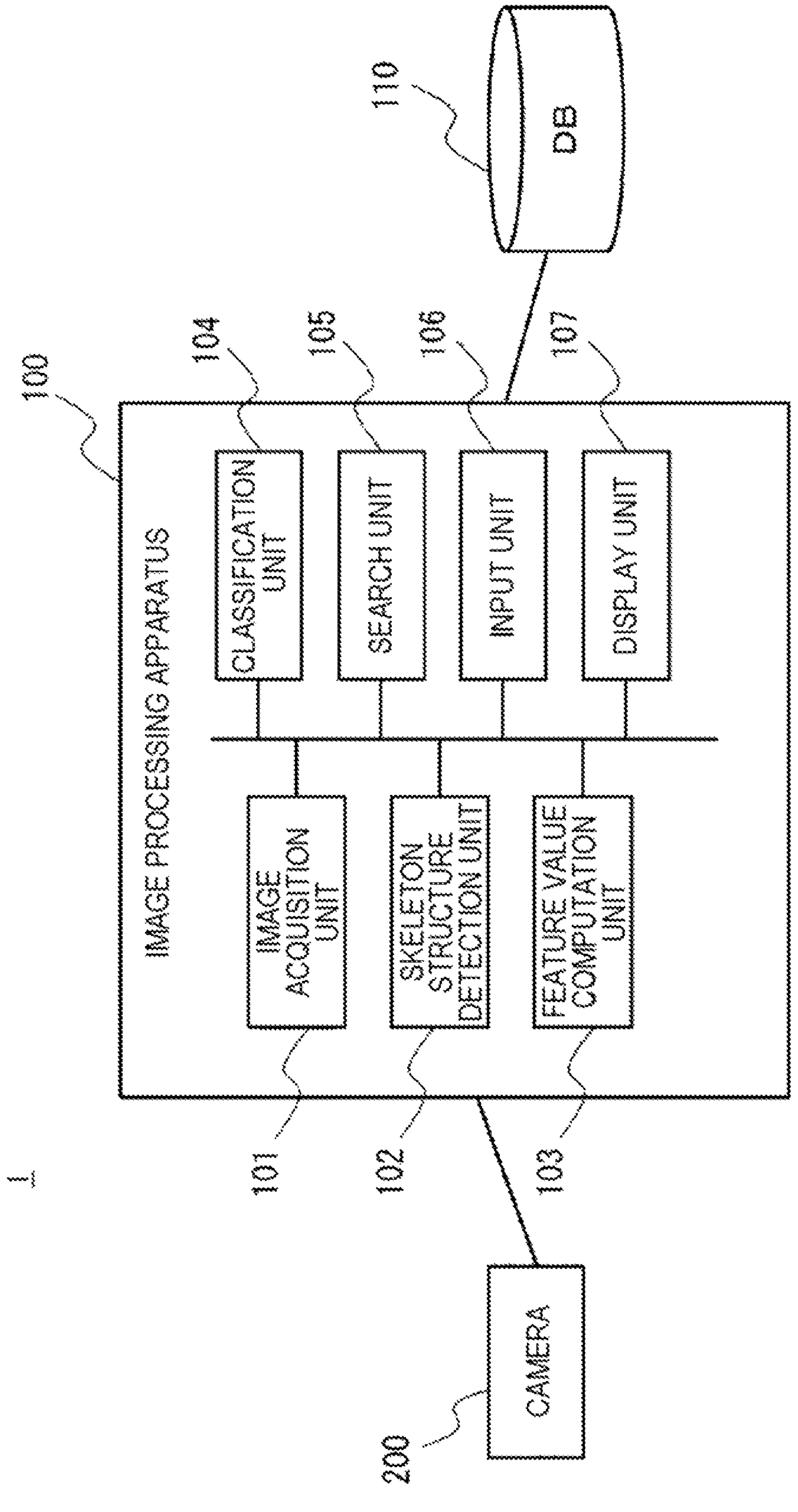
FIG. 2 is a configuration diagram illustrating a configuration of an image processing apparatus according to an example embodiment 1.

Hereinafter, an example embodiment 1 will be described with reference to the drawings. FIG. 2 illustrates a configuration of an image processing apparatus 100 according to the present example embodiment. The image processing apparatus 100 constitutes an image processing system 1 together with a camera 200 and a storage means (database (DB) 110). The image processing system 1 including the image processing apparatus 100 is a system for classifying and searching for a state such as a pose and behavior of a person, based on a skeleton structure of the person estimated from an image.

The camera 200 is a capturing unit, such as a surveillance camera, that generates a two-dimensional image. The camera 200 is installed at a predetermined place, and captures a person and the like in a capturing region from the installed place. The camera 200 is directly connected to the image processing apparatus 100 in a wired or wireless manner in such a way as to be able to output a captured image (video), or is connected to the image processing apparatus 100 via any communication network, and the like. Note that, the camera 200 may be provided inside the image processing apparatus 100.

The database 110 is a database that stores information (data) needed for processing of the image processing apparatus 100, a processing result, and the like. The database 110 stores an image acquired by an image acquisition unit 101, a detection result of a skeleton structure detection unit 102, data for machine learning, a feature value computed by a feature value computation unit 103, a classification result of a classification unit 104, a search result of a search unit 105, and the like. The database 110 is directly connected to the image processing apparatus 100 in a wired or wireless manner in such a way as to be able to input and output data as necessary, or is connected to the image processing apparatus 100 via any communication network, and the like. Note that, the database 110 may be provided inside the image processing apparatus 100 as a non-volatile memory such as a flash memory, a hard disk apparatus, and the like.

As illustrated in FIG. 2, the image processing apparatus 100 includes the image acquisition unit 101, the skeleton structure detection unit 102, the feature value computation unit 103, the classification unit 104, the search unit 105, an input unit 106, and a display unit 107. Note that, a configuration of each unit (block) is one example, and other each unit may be used for a configuration as long as a method (operation) described below can be achieved. Further, the image processing apparatus 100 is achieved by, for example, a computer apparatus, such as a personal computer and a server, that executes a program, but may be achieved by one apparatus 5 or may be achieved by a plurality of apparatuses on a network. For example, the input unit 106, the display unit 107, and the like may be an external apparatus. Further, both of the classification unit 104 and the search unit 105 may be provided, or only one of them may be provided. Both or one of the classification unit 104 and the search unit 105 is a recognition unit that performs recognition processing of a state of a person.

The image processing apparatus 100 executes data accumulation processing, classification processing, and search processing in this order. Note that, as will be described below, the image processing apparatus 100 may not execute the classification processing.

<Data Accumulation Processing>

The data accumulation processing is processing of acquiring an image to be an analysis target (hereinafter, an "analysis target image"), detecting a two-dimensional skeleton structure of a person from each of a plurality of analysis target images, computing a feature value of the detected two-dimensional skeleton structure, and storing the computed feature value in the database 110 in association with each analysis target image. Hereinafter, a configuration of a functional unit related to the data accumulation processing will be described.

The image acquisition unit 101 acquires an analysis target image. In the description, "acquisition" includes at least one of "acquisition, by its own apparatus, of data being stored in another apparatus or a storage medium (active acquisition)", based on a user input, or based on an instruction of a program, for example, receiving by making a request or an inquiry to another apparatus, reading by accessing another apparatus or a storage medium, and the like, "inputting of data output from another apparatus to its own apparatus (passive acquisition)", based on a user input, or based on an instruction of a program, for example, reception of data to be distributed (transmitted, push-notified, or the like), or acquisition of selection from among pieces of received data or pieces of received information, and "generating new data by editing data (text editing, rearranging the data, extracting a part of pieces of the data, changing the file format, or the like), and the like, and acquiring the new data".

For example, the image acquisition unit 101 acquires a two-dimensional image including a person captured by the camera 200 in a predetermined surveillance period as an analysis target image. In addition, the image acquisition unit 101 may acquire a two-dimensional image including a person stored in a storage means such as the database 110 as an analysis target image.

The skeleton structure detection unit 102 detects a two-dimensional skeleton structure of a person from each of the acquired analysis target images. The skeleton structure detection unit 102 can detect a skeleton structure for all persons recognized in the analysis target image. The skeleton structure detection unit 102 detects a skeleton structure of a person, based on a feature to be recognized such as a joint of the person, by using a skeleton estimation technique using machine learning. The skeleton structure detection unit 102 uses, for example, a skeleton estimation technique such as OpenPose in Non-Patent Document 1.

The feature value computation unit 103 computes a feature value of the detected two-dimensional skeleton structure, and stores, in the database 110, the computed feature value in association with an analysis target image in which the two-dimensional skeleton structure is detected. The feature value of the skeleton structure indicates a feature of a skeleton of a person, and serves as an element for classifying and searching for a state of the person, based on the skeleton of the person. Normally, the feature value includes a plurality of parameters (for example, a classification element described below). The feature value may be a feature value of the entire skeleton structure, may be a feature value of a part of the skeleton structure, or may include a plurality of feature values as in each portion of the skeleton structure. A method for computing a feature value may be any method such as machine learning and normalization, and a minimum value and a maximum value may be acquired as normalization. As one example, the feature value is a feature value acquired by performing machine learning on the skeleton structure, a size of the skeleton structure from a head to a foot on an image, and the like. The size of the skeleton structure is a height in an up-down direction, an area, and the like of a skeleton region including the skeleton structure on an image. The up-down direction (a height direction or a vertical direction) is a direction (Y-axis direction) of up and down in an image, and is, for example, a direction perpendicular to the ground (reference surface). Further, a left-right direction (a horizontal direction) is a direction (X-axis direction) of left and right in an image, and is, for example, a direction parallel to the ground.

Note that, in order to perform classification and a search desired by a user, it is preferable to use a feature value having robustness with respect to classification and search processing. For example, when a user desires classification and a search that do not depend on an orientation or a body shape of a person, a feature value being robust with respect to the orientation and the body shape of the person may be used. A feature value that does not depend on an orientation and a body shape of a person can be acquired by learning a skeleton of a person facing in various directions with the same pose and skeletons of persons having various body shapes with the same pose, or extracting a feature only in the up-down direction of a skeleton.

<Classification Processing>

The classification processing is processing of collectively classifying (grouping) a plurality of two-dimensional skeleton structures extracted from an analysis target images having a similar feature value with each other, based on data (data in which the analysis target image and a feature value of the two-dimensional skeleton structure extracted from each analysis target image are associated with each other) stored in the database 110 in the data accumulation processing. Note that, the analysis target image and the two-dimensional skeleton structure extracted from each analysis target image are associated with each other. Thus, classification of a plurality of two-dimensional skeleton structures by the classification processing is also classification of a plurality of analysis target images. The plurality of analysis target images including a similar two-dimensional skeleton structure are collected with each other by the classification processing. Hereinafter, a configuration of a functional unit related to the classification processing will be described.

The classification unit 104 classifies (performs clustering) a plurality of skeleton structures stored in the database 110, based on a degree of similarity between feature values of the skeleton structures. It can also be said that, as the recognition processing on a state of a person, the classification unit 104 classifies states of a plurality of persons, based on feature values of the skeleton structures. The degree of similarity is a distance between the feature values of the skeleton structure. The classification unit 104 may classify by a degree of similarity between feature values of the entire skeleton structure, may classify by a degree of similarity between the feature values of a part of the skeleton structure, or may classify by a degree of similarity between feature values of a first portion (for example, both hands) and a second portion (for example, both feet) of the skeleton structure. Note that, a pose of a person may be classified based on a feature value of a skeleton structure of the person in each image, and behavior of a person may be classified based on a change in a feature value of a skeleton structure of the person in a plurality of images successive in time series. In other words, the classification unit 104 can classify a state of a person including a pose and behavior of the person, based on a feature value of a skeleton structure. For example, the classification unit 104 sets, as classification targets, a plurality of skeleton structures in a plurality of images captured in a predetermined surveillance period. The classification unit 104 acquires a degree of similarity between feature values of classification targets, and classifies in such a way that the skeleton structures having a high degree of similarity are in the same cluster (a group with a similar pose). Note that, similar to a search, a user may be able to specify a classification condition. The classification unit 104 can store a classification result of the skeleton structure in the database 110, and also display the classification result on the display unit 107.

<Search Processing>

The search processing is processing of searching for a predetermined skeleton structure from among a plurality of two-dimensional skeleton structures extracted from an analysis target image, based on data (data in which the analysis target image and a feature value of the two-dimensional skeleton structure extracted from each analysis target image are associated with each other) stored in the database 110 in the data accumulation processing. Note that, the analysis target image and the two-dimensional skeleton structure extracted from each analysis target image are associated with each other. Thus, an analysis target image including a predetermined skeleton structure can be searched by "processing of searching for the predetermined skeleton structure from among a plurality of two-dimensional skeleton structures extracted from the analysis target image" described above. Hereinafter, a configuration of a functional unit related to the search processing will be described.

The image acquisition unit 101 acquires a query image, based on an input keyword. As the keyword, a content related to a state (a pose, behavior, and the like) of a person is assumed, such as "sit", "stand", and the like.

Herein, an example of processing of accepting an input of a keyword will be described.

Keyword Reception Processing Example 1

Figure 39:
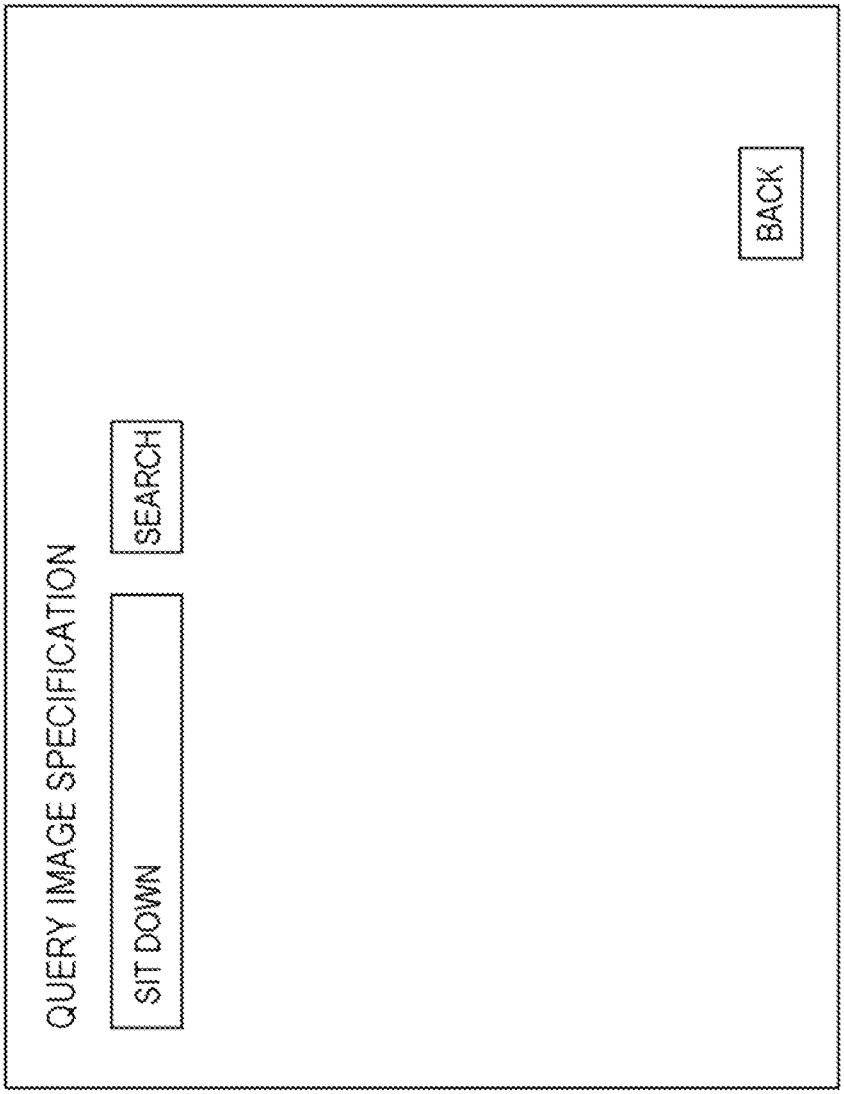
FIG. 39 is a diagram schematically illustrating one example of a screen output by the image processing apparatus.

For example, as illustrated in FIG. 39, the image acquisition unit 101 may accept an input of a keyword via an input acceptance screen including a text box (GUI). Any input apparatus such as a keyboard, a mouse, a touch panel, a microphone, and a physical button can be adopted for inputting text.

Keyword Reception Processing Example 2

Figure 40:
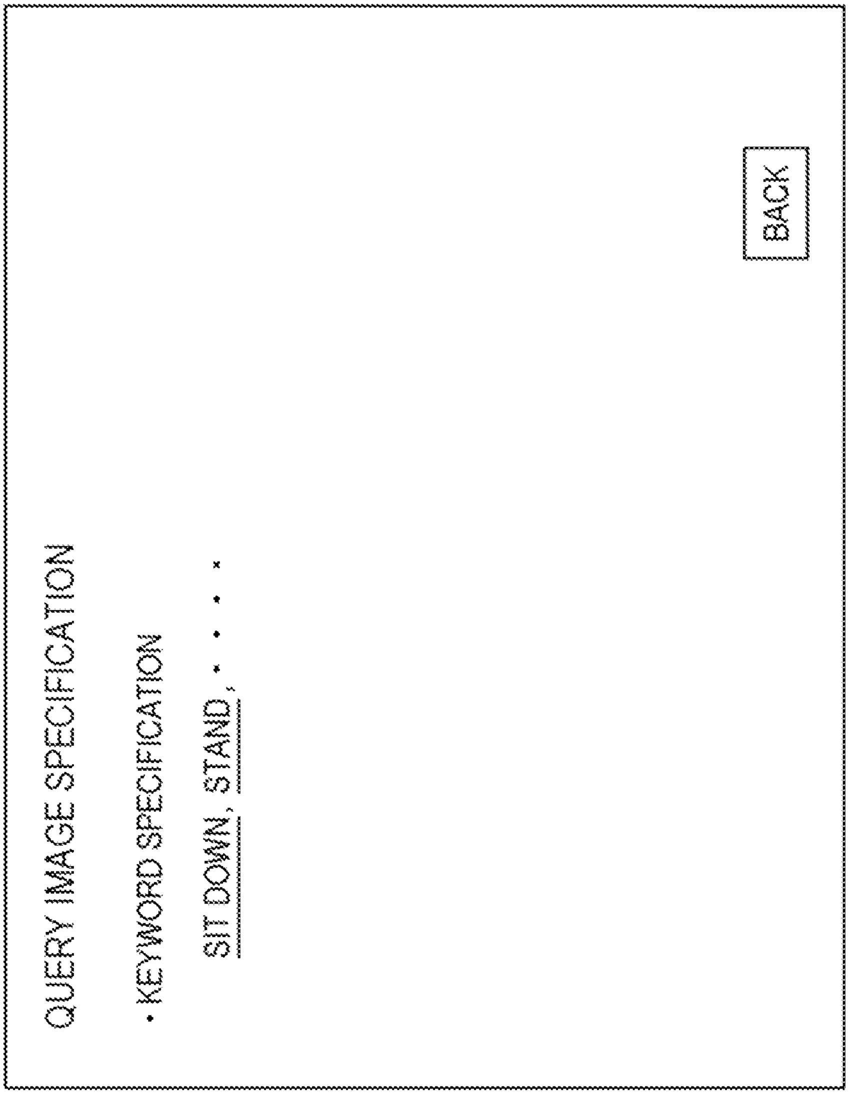
FIG. 40 is a diagram schematically illustrating one example of a screen output by the image processing apparatus.

In addition, for example, as illustrated in FIG. 40, the image acquisition unit 101 may accept an input of a keyword via an input acceptance screen for selectably displaying a plurality of keywords. Note that, although not illustrated, selection of a keyword may be accepted from among a plurality of keywords by using a well-known GUI such as a drop-down or a check box. Any input apparatus such as a keyboard, a mouse, a touch panel, a microphone, and a physical button can be adopted for the input.

Note that, only a keyword indicating a state of a person included in an analysis target image may be selectably displayed. For example, association information in which a feature value of a two-dimensional skeleton structure and a word indicating a state of a person of the skeleton structure are associated with each other may be stored in advance in the database 110. Then, the image acquisition unit 101 may acquire, from the association information, a word associated with a two-dimensional skeleton structure detected from an analysis target image in the data accumulation processing, and display the acquired word in a selectable manner.

Keyword Reception Processing Example 3

The database 110 may store a related word dictionary in advance. FIG. 41 illustrates one example of a related word dictionary. As illustrated, the related word dictionary is information associating one or a plurality of keywords indicating a state of each person for each state of the person. The related word dictionary may indicate relevance of a plurality of keywords in a hierarchical structure, as illustrated. For example, a word of a subordinate concept such as "sitting straight", and "sitting cross-legged" is located under "sit".

Then, when accepting an input of one keyword by a method described in the keyword acceptance processing examples 1 and 2, the image acquisition unit 101 may output a screen on which a keyword located under the keyword is selectably displayed, and accept an input of a more detailed keyword from the screen. By doing so, the keyword to be specified is narrowed down to a more subordinate concept, and a desired search result is easily acquired.

Keyword Reception Processing Example 4

The image acquisition unit 101 may accept an input of a search condition in which a plurality of keywords are connected by a logical operator, by using methods described in the keyword acceptance processing examples 1 to 3 and a well-known method.

Next, an example of processing of searching for an image (an image as a candidate of a query image) from an input keyword will be described.

Image Search Processing Example 1

Figure 42:
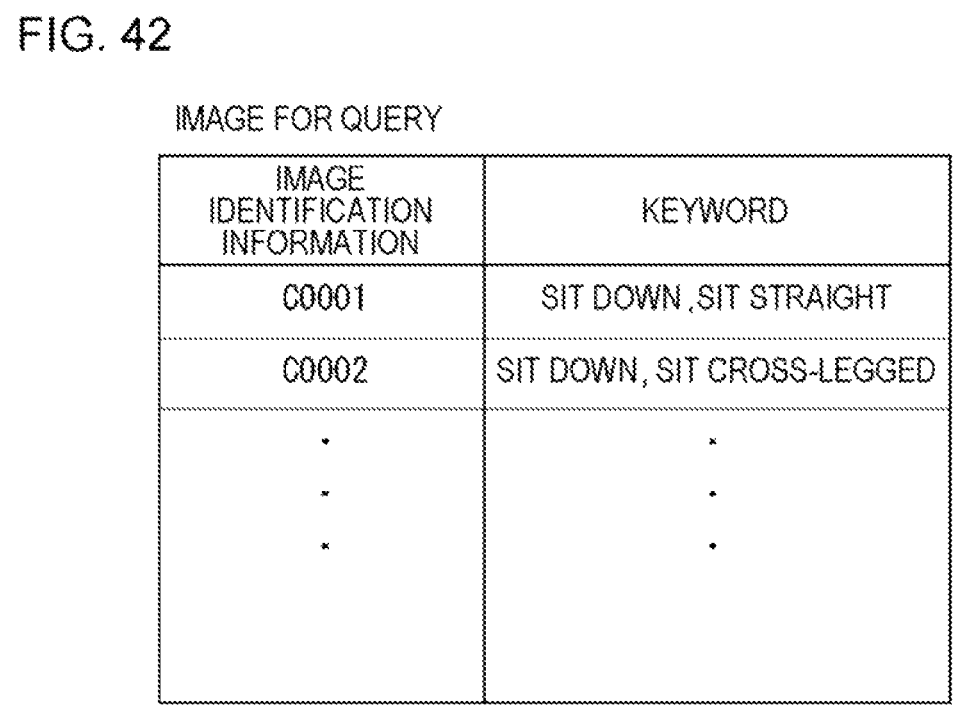

For example, as illustrated in FIG. 42, information associating an image prepared to be used as a query (hereinafter, an "image for a query") with a keyword (a word indicating a state of a person included in each image) is registered in the database 110 in advance. The image acquisition unit 101 searches for an image for a query associated with an input keyword from among the pieces of information. Then, the image acquisition unit 101 acquires a part or all of the images for a query included in a search result as a query image.

Note that, as illustrated in FIG. 43, a keyword may be associated with a part of analysis target images acquired in the data accumulation processing. In this case, the analysis target image associated with the keyword becomes an image for a query.

Image Search Processing Example 2

In addition, the image acquisition unit 101 may transmit an input keyword to a search engine that searches for an image related to the keyword, and acquire a search result from the search engine. Then, the image acquisition unit 101 acquires a part or all of the images included in the search result as a query image.

Note that, the image acquisition unit 101 may perform a search for the image, based on a related word related to the input keyword in place of or in addition to the input keyword. The related word related to the input keyword is a keyword having a meaning similar to that of the input keyword or a keyword located under the input keyword in the hierarchical structure described above. The image acquisition unit 101 can extract a related word related to the input keyword, based on a related word dictionary as illustrated in FIG. 41, for example, and search for an image based on the related word. In the related word dictionary, a word group having a meaning similar to each other (e.g., sit, sitting, sit down, and the like) can be registered as related words.

As described above, the image acquisition unit 101 acquires a part or all of the images included in the search result as a query image. Herein, an example of the processing will be described.

Processing Example 1

The image acquisition unit 101 can acquire all the images included in the search result as a query image.

Processing Example 2

Figure 44:
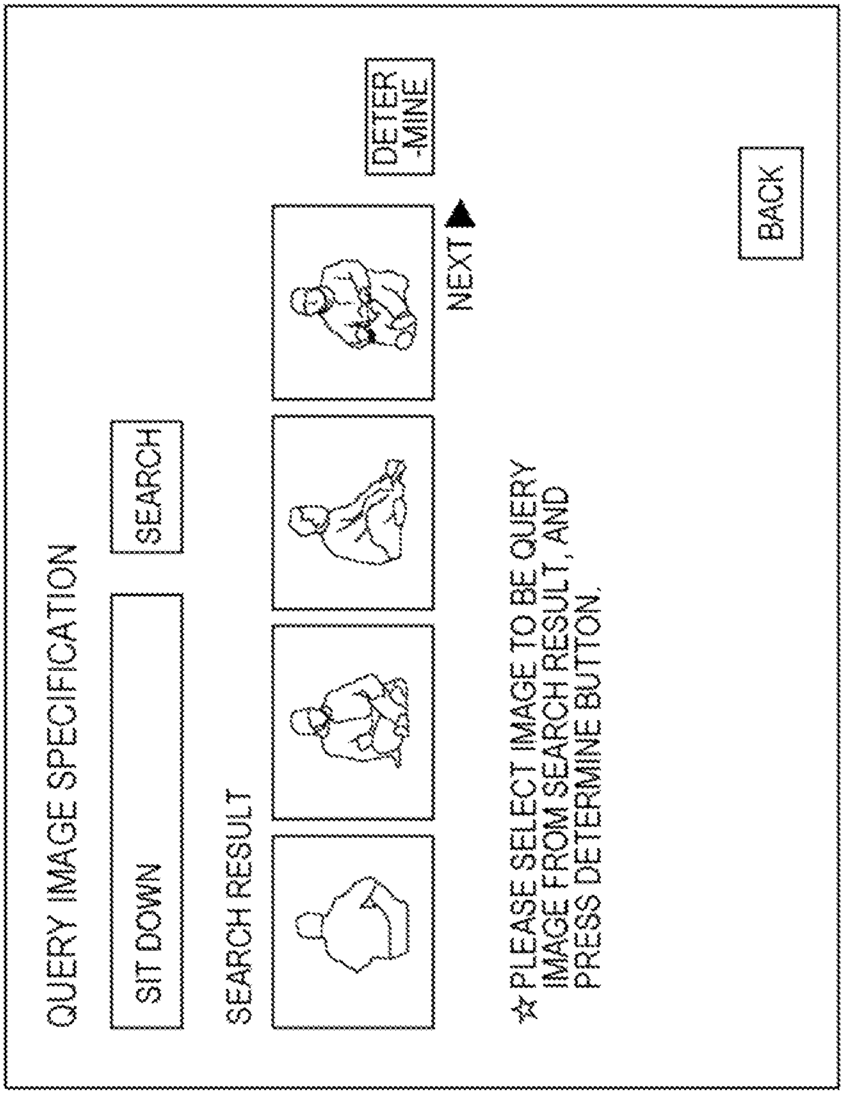
FIG. 44 is a diagram schematically illustrating one example of a screen output by the image processing apparatus.

For example, as illustrated in FIG. 44, the image acquisition unit 101 outputs, toward a user, an image (in the drawing, an image displayed as a search result) included in a result of an image search based on the input keyword. Then, the image acquisition unit 101 can accept a user input for selecting at least one of the images included in the search result, and acquire the selected image as a query image.

Note that, a plurality of images may be included in the search result. Therefore, the image acquisition unit 101 may determine at least one of the number of persons and a size of a person (a size of a region occupied by a person in the image) in the image included in the search result, and output a plurality of images included in the search result in an output order (arrangement order) decided based on a result of determination. The smaller the number of persons and the larger the size of the person, the higher priority and the higher the output order.

Processing Example 3

The image acquisition unit 101 can acquire a query image from among the images included in the search result by any predetermined rule. For example, the image acquisition unit 101 may determine at least one of the number of persons and a size of a person (a size of a region occupied by a person in the image) in the image included in the search result, and acquire a query image, based on a result of determination. In this case, the smaller the number of persons and the larger the size of the person, the higher priority to be acquired. For example, the image acquisition unit 101 may acquire, as a query image, an image in which the number of persons is equal to or smaller than a reference value. In addition, the image acquisition unit 101 may acquire, as a query image, an image in which a size of a person is equal to or larger than a reference value. In addition, the image acquisition unit 101 may acquire, as a query image, an image in which the number of persons is equal to or smaller than the reference value and a size of a person is equal to or larger than the reference value. In addition, the image acquisition unit 101 may acquire, as a query image, an image in which at least one of the number of persons having a reference value or less and a size of a person having a reference value or more is satisfied.

The skeleton structure detection unit 102 detects a two-dimensional skeleton structure of a person included in a query image. The feature value computation unit 103 computes a feature value of the detected two-dimensional skeleton structure. The pieces of processing are as described in the data accumulation processing.

The search unit 105 searches for a skeleton structure having a high degree of similarity to a feature value of a search query (query state) (a feature value of a two-dimensional skeleton structure extracted from a query image) from among the plurality of skeleton structures stored in the database 110 in the data accumulation processing.

For example, the search unit 105 may search for a skeleton structure having a high degree of similarity to a feature value of a search query by collating a feature value of the search query with a feature value of the skeleton structure extracted from each of a plurality of analysis target images. In a case of this configuration, the classification processing described above is not necessary. However, since a collation target is all of the plurality of analysis target images, a processing load of a computer in the collation increases.

Therefore, the search unit 105 may decide, by any means, a representative of the feature value of the two-dimensional skeleton structure for each group acquired in the classification processing, and search for the skeleton structure having a high degree of similarity to the feature value of the search query by collating the representative with the feature value of the search query described above. In a case of this configuration, since the number of collation targets is decreased, a processing load of a computer in the collation is decreased.

Note that, an analysis target image and a two-dimensional skeleton structure extracted from each analysis target image are associated with each other. Therefore, an analysis target image including a predetermined skeleton structure (a skeleton structure having a high degree of similarity to a feature value of a search query) can be searched by "processing of searching for the predetermined skeleton structure from among a plurality of two-dimensional skeleton structures extracted from the analysis target image" described above. In other words, an analysis target image including a person in a state similar to a state of a person included in a query image can be searched from among the analysis target images.

The degree of similarity is a distance between the feature values of the skeleton structure. The search unit 105 may search by a degree of similarity between feature values of the entire skeleton structure, may search by a degree of similarity between the feature values of a part of the skeleton structure, or may search by a degree of similarity between feature values of the first portion (for example, both hands) and the second portion (for example, both feet) of the skeleton structure. Note that, a pose of a person may be searched based on a feature value of a skeleton structure of the person in each image, and behavior of a person may be searched based on a change in a feature value of a skeleton structure of the person in a plurality of images successive in time series. In other words, the search unit 105 can search for a state of a person including a pose and behavior of the person, based on a feature value of a skeleton structure. For example, the search unit 105 sets, as search targets, a plurality of feature values of skeleton structures in a plurality of analysis target images captured in a predetermined surveillance period.

The input unit 106 is an input interface that acquires information input from a user who operates the image processing apparatus 100. For example, a user is a supervisor who surveys a person in a suspicious state from an image of a surveillance camera. The input unit 106 is, for example, a graphical user interface (GUI), and is input information according to an operation of a user from an input apparatus such as a keyboard, a mouse, a touch panel, a microphone, or a physical button.

The display unit 107 is a display unit that displays a result of an operation (processing) of the image processing apparatus 100, and the like, and is, for example, a display apparatus such as a liquid crystal display or an organic electro luminescence (EL) display. The display unit 107 displays a classification result of the classification unit 104, a search result of the search unit 105, and the like.

Next, one example of a hardware configuration of the image processing apparatus 100 will be described. Each functional unit of the image processing apparatus 100 is achieved by any combination of hardware and software mainly including a central processing unit (CPU) of any computer, a memory, a program loaded into a memory, a storage unit (can store a program stored from a stage of shipping an apparatus in advance, and also a program downloaded from a storage medium such as a compact disc (CD), a server on the Internet, or the like) such as a hard 5 disk storing the program, and an interface for network connection. Then, those skilled in the art will appreciate that there are various modifications to the achieving method and apparatus.

Figure 45:
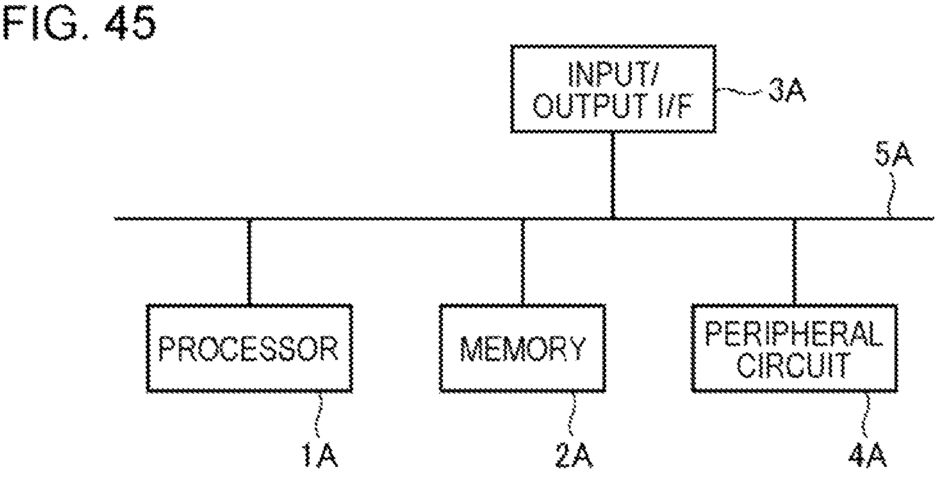
FIG. 45 is a diagram illustrating a hardware configuration example of the image processing apparatus.

FIG. 45 is a block diagram illustrating a hardware configuration of the image processing apparatus 100. As illustrated in FIG. 45, the image processing apparatus 100 includes a processor 1A, a memory 2A, an input/output interface 3A, a peripheral circuit 4A, and a bus 5A. The peripheral circuit 4A includes various modules. The image processing apparatus 100 may not include the peripheral circuit 4A. Note that, the image processing apparatus 100 may be configured by a plurality of physically and/or logically separated apparatuses, or may be configured by one apparatus being physically and/or logically integrated. When the image processing apparatus 100 is configured by a plurality of physically and/or logically separated apparatuses, each of the plurality of apparatuses can include the hardware configuration described above.

The bus 5A is a data transmission path through which the processor 1A, the memory 2A, the peripheral circuit 4A, and the input/output interface 3A transmit and receive data to and from one another. The processor 1A is, for example, an arithmetic processing apparatus such as a CPU, and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can issue an instruction to each module, and perform an arithmetic operation, based on results of the operation.

Figure 3:
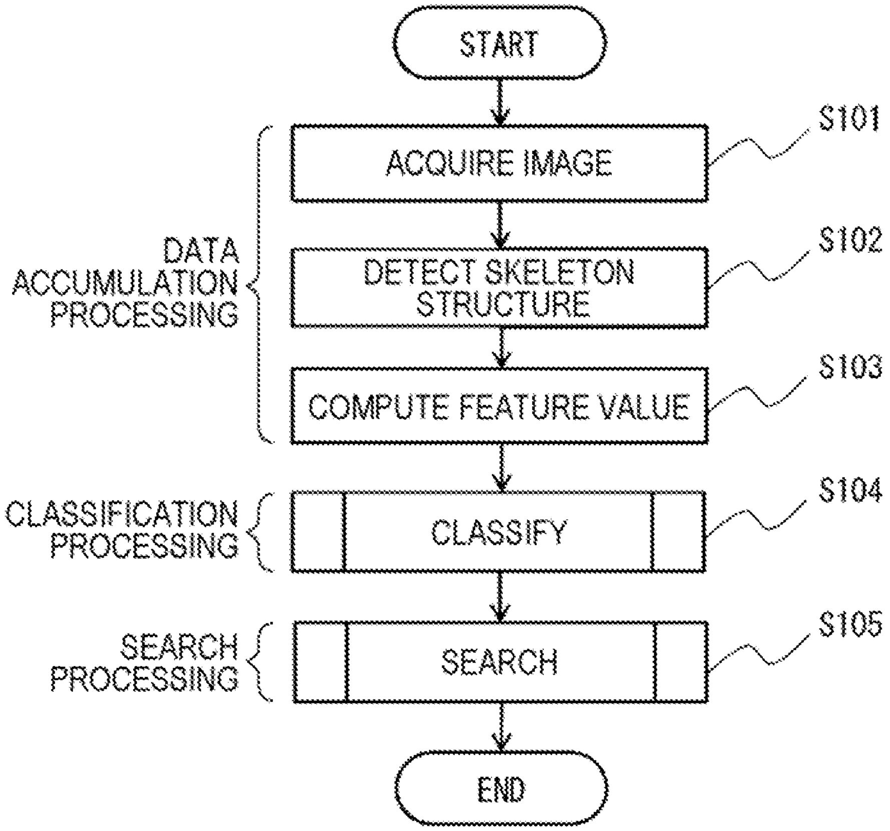
FIG. 3 is a flowchart illustrating an image processing method according to the example embodiment 1.
Figure 4:
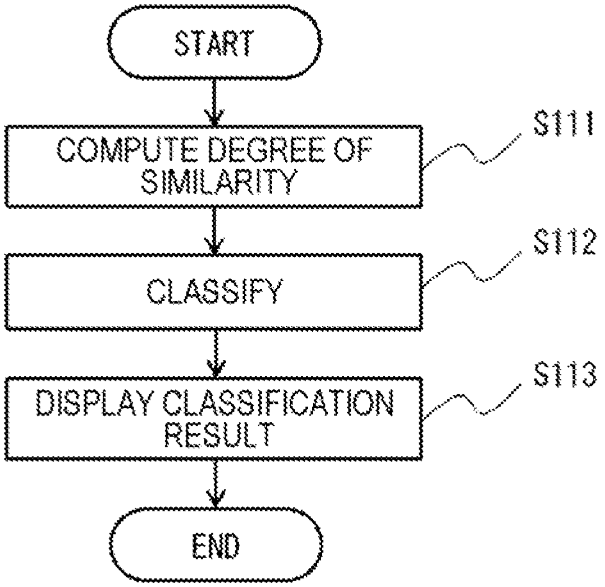
FIG. 4 is a flowchart illustrating a classification method according to the example embodiment 1.
Figure 5:
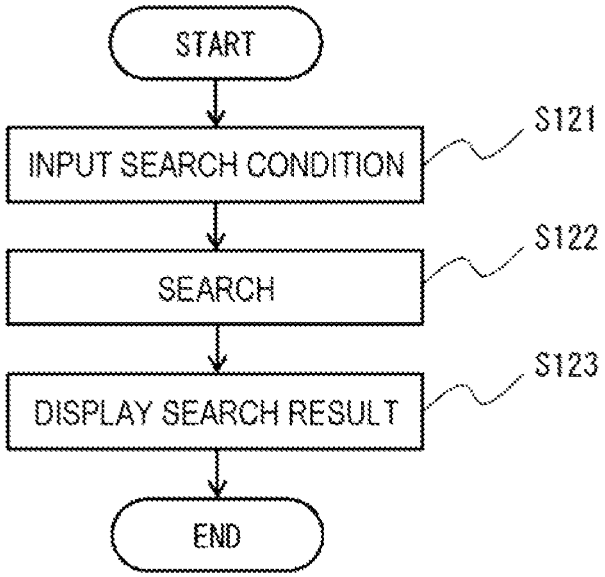
FIG. 5 is a flowchart illustrating a search method according to the example embodiment 1.
Figure 46:
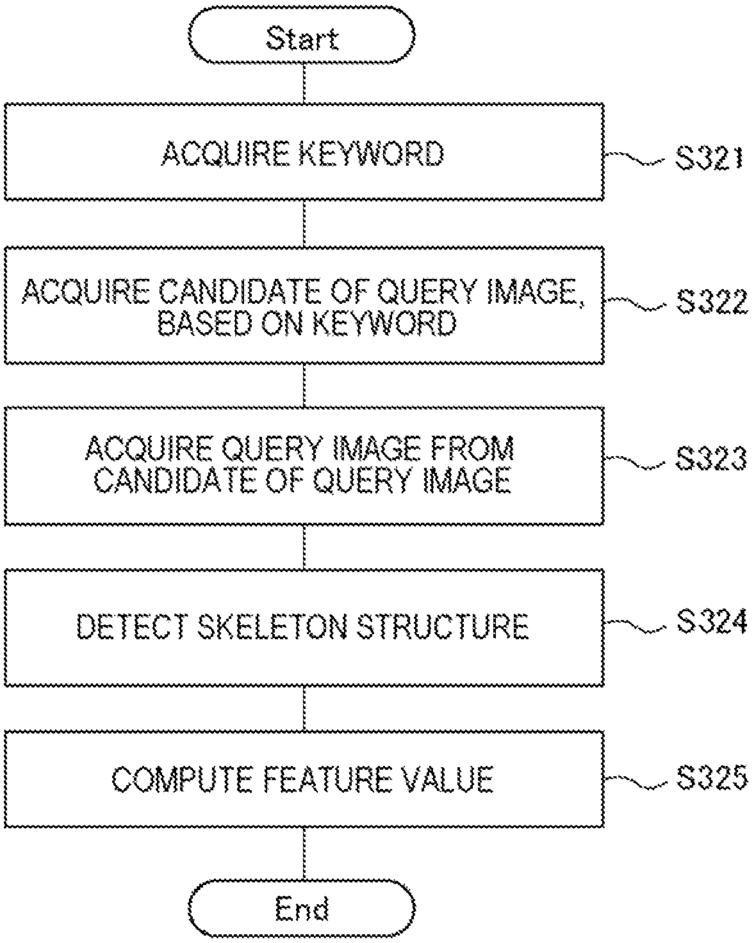
FIG. 46 is a flowchart illustrating one example of a flow of processing of the image processing apparatus.

FIGS. 3 to 5, and 46 illustrate operations of the image processing apparatus 100 according to the present example embodiment. FIG. 3 illustrates a flow from image acquisition to search processing in the image processing apparatus 100, FIG. 4 illustrates a flow of classification processing (S104) in FIG. 3, and FIGS. 5 and 46 illustrate flows of search processing (S105) in FIG. 3.

Figure 6:
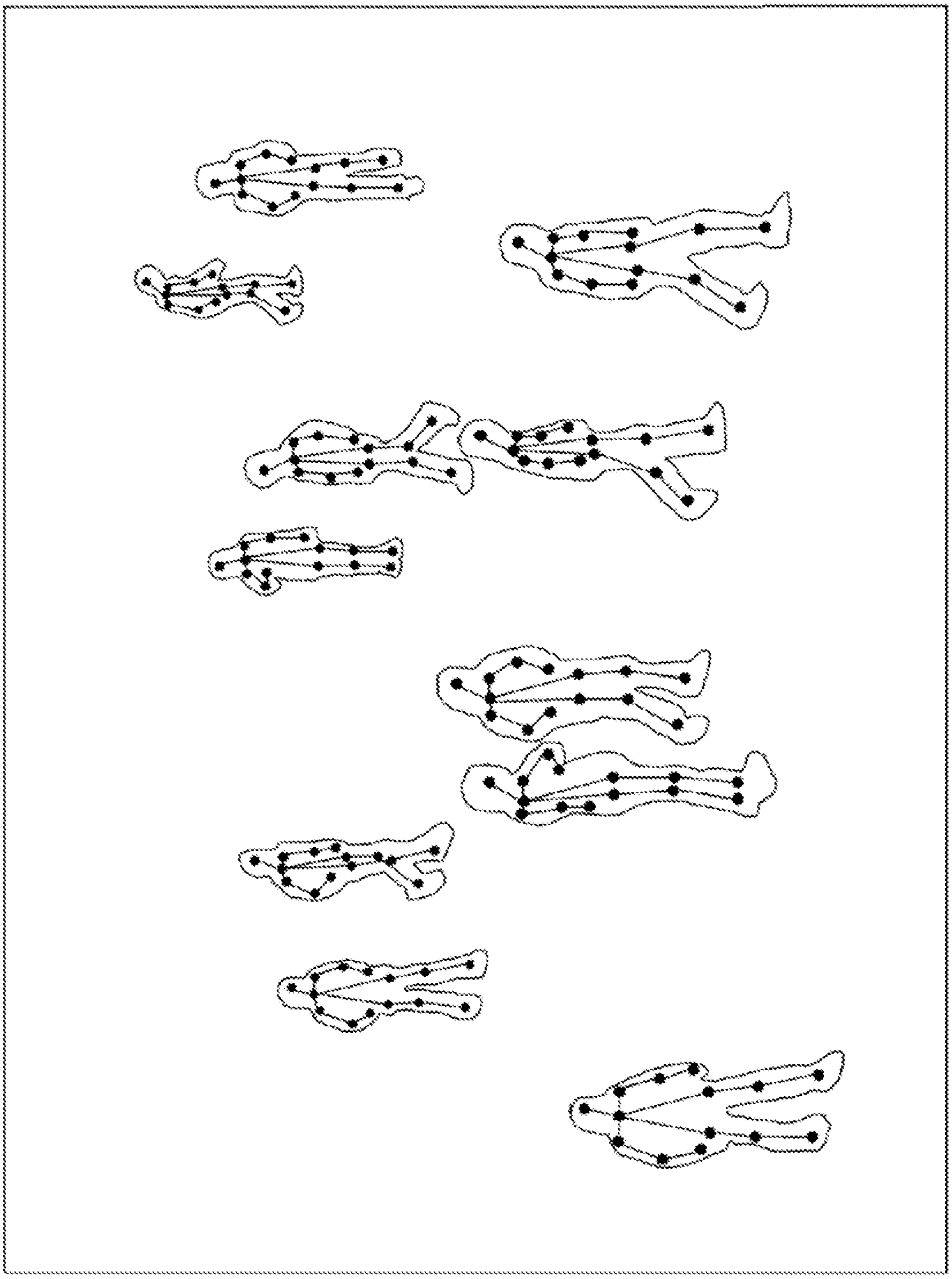
FIG. 6 is a diagram illustrating a detection example of skeleton structures according to the example embodiment 1.

As illustrated in FIG. 3, the image acquisition unit 101 acquires a plurality of analysis target images (S101). Subsequently, the skeleton structure detection unit 102 detects a two-dimensional skeleton structure of a person from each of the plurality of acquired analysis target images (S102). FIG. 6 illustrates a detection example of skeleton structures. As illustrated in FIG. 6, there is a case where the analysis target image includes a plurality of persons. In this case, the skeleton structure detection unit 102 detects a skeleton structure for each person included in the analysis target image.

Figure 7:
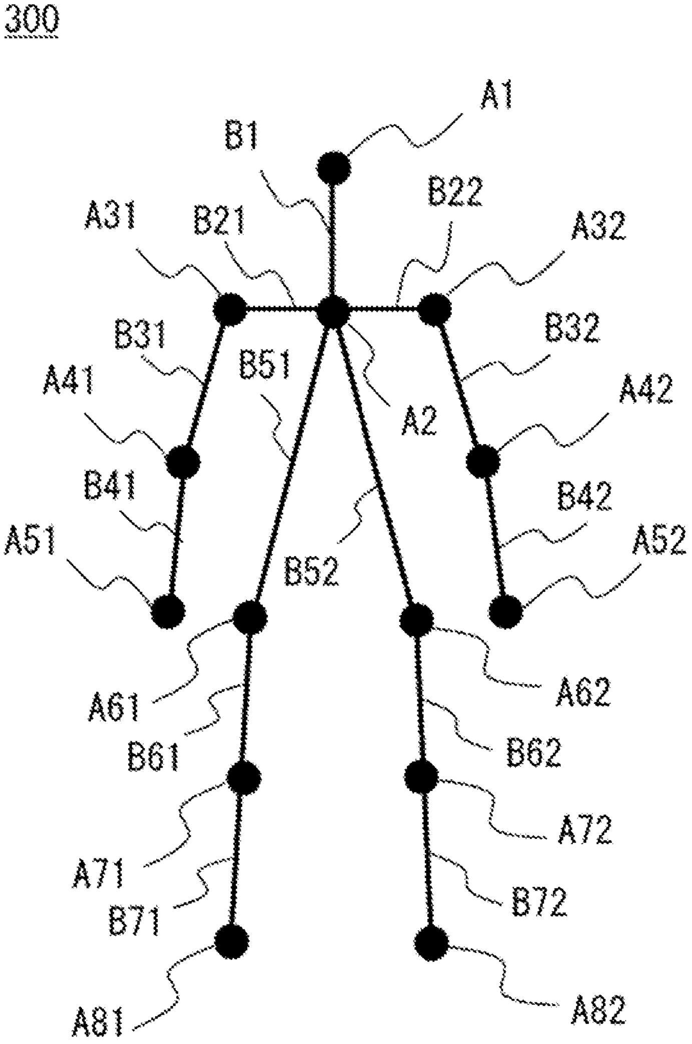
FIG. 7 is a diagram illustrating a human model according to the example embodiment 1.
Figure 8:
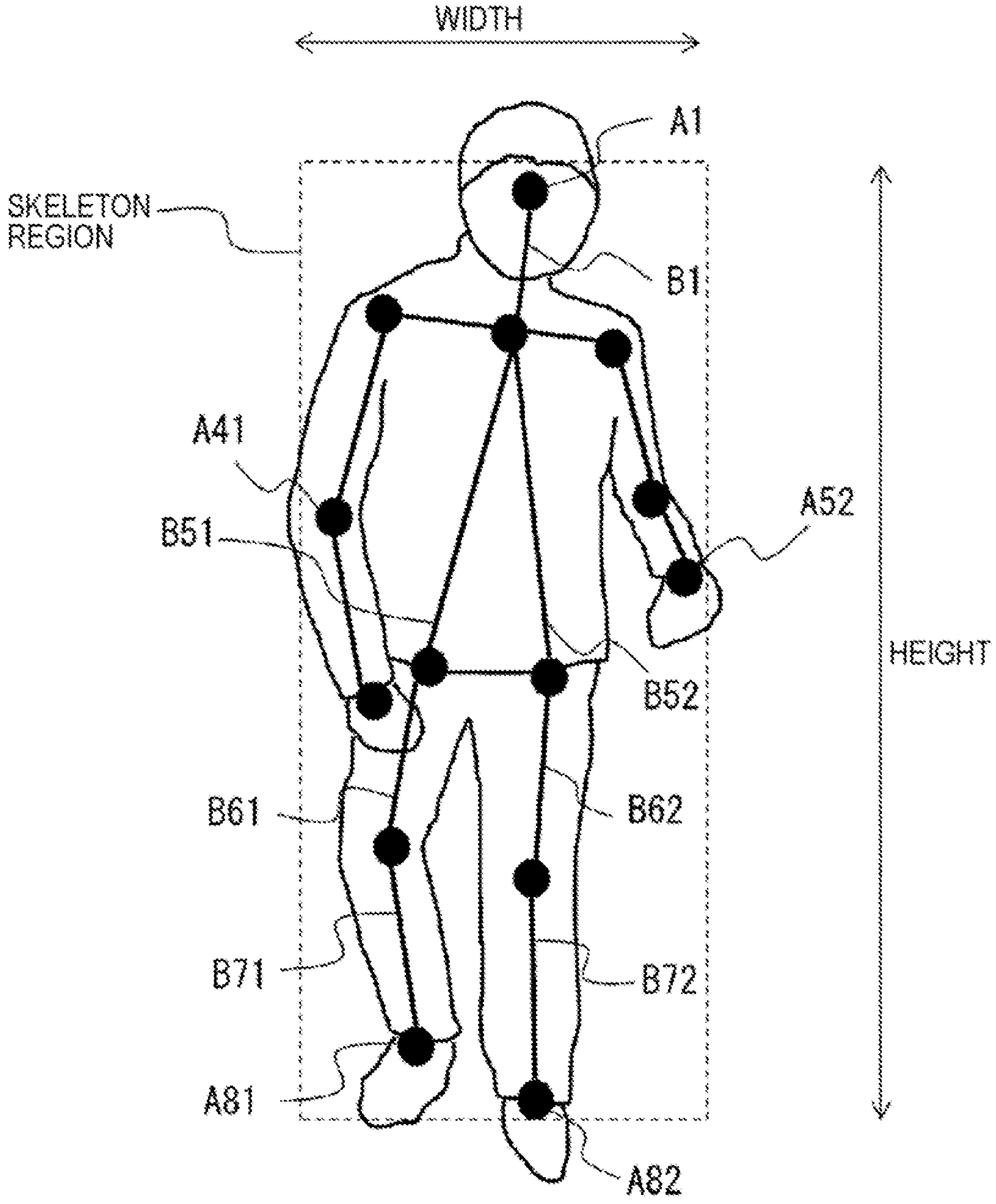
FIG. 8 is a diagram illustrating a detection example of the skeleton structure according to the example embodiment 1.
Figure 9:
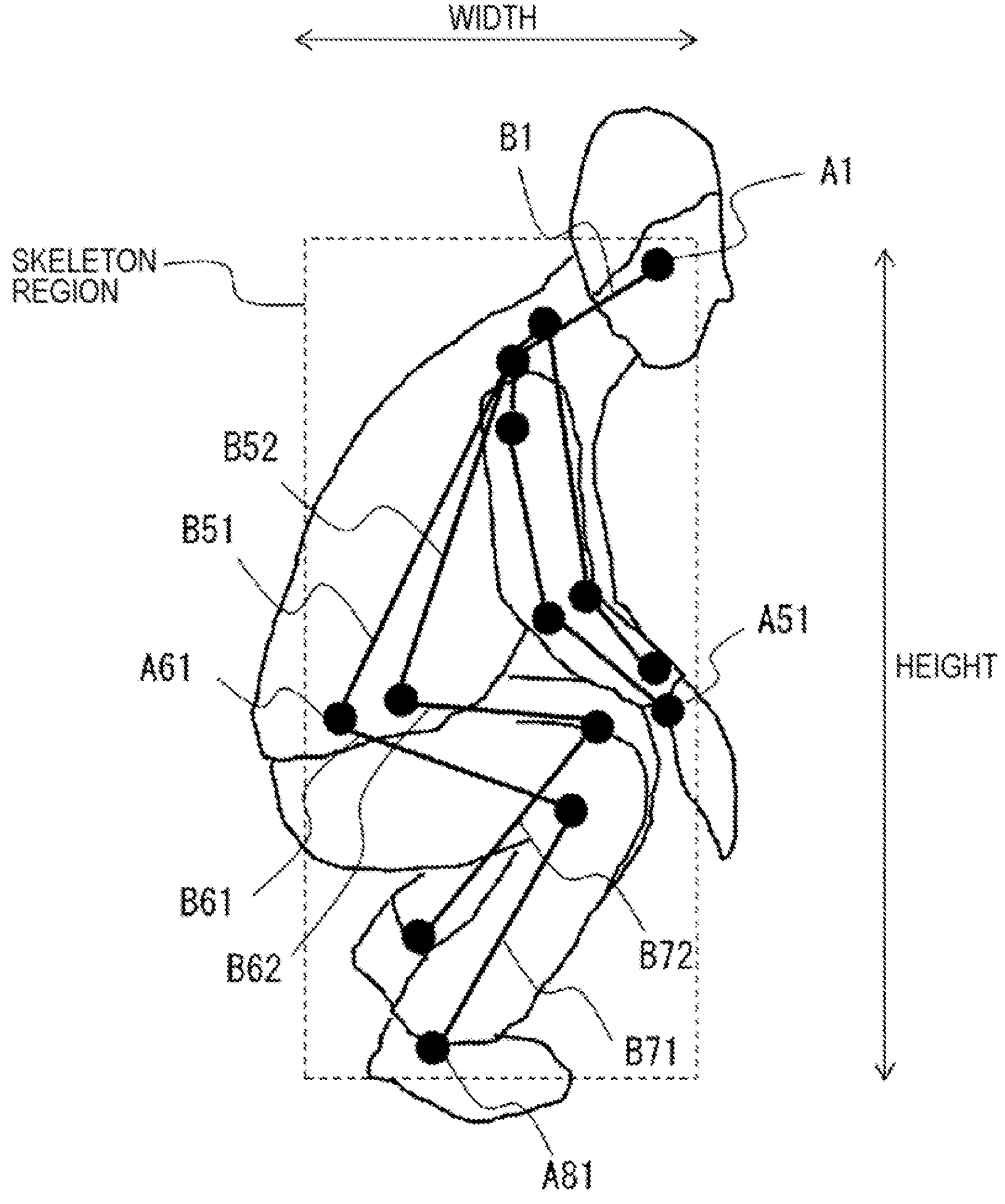
FIG. 9 is a diagram illustrating a detection example of the skeleton structure according to the example embodiment 1.
Figure 10:
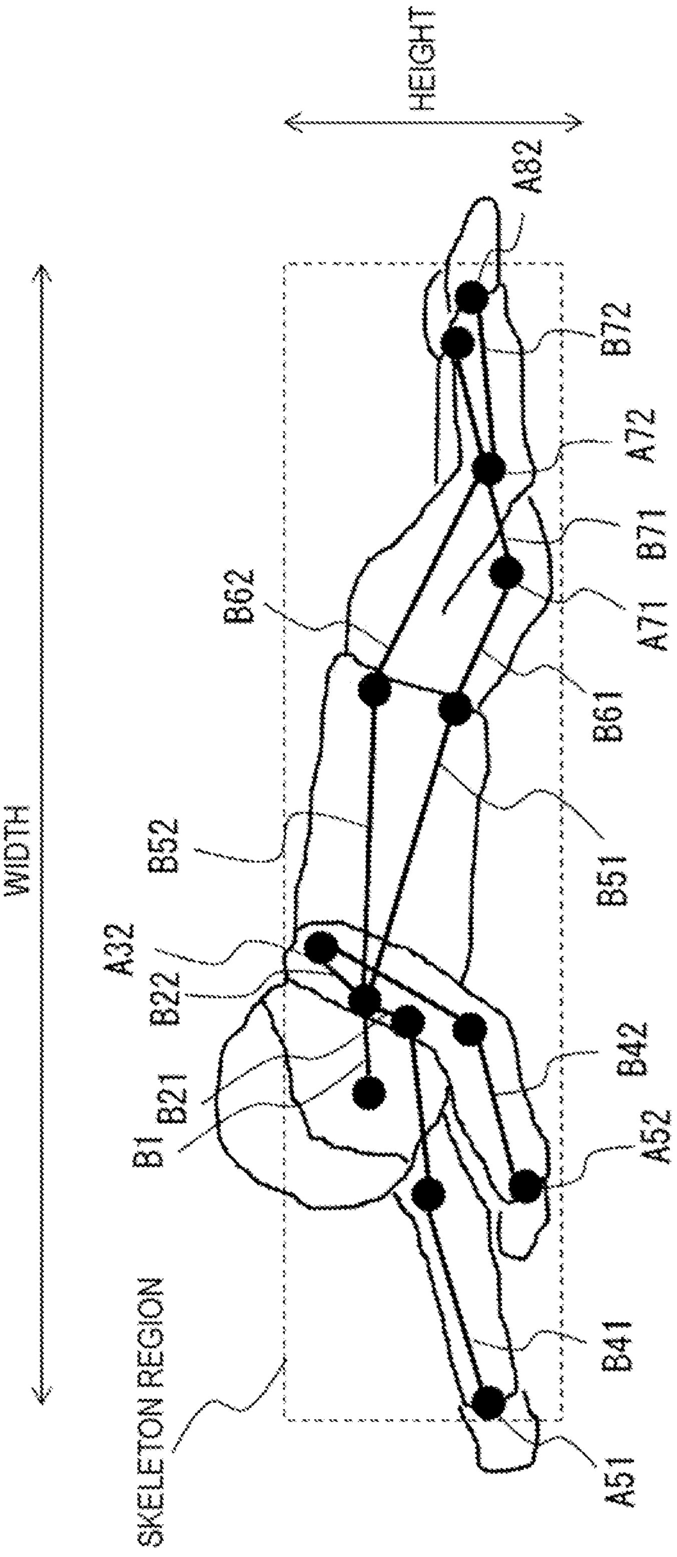
FIG. 10 is a diagram illustrating a detection example of the skeleton structure according to the example embodiment 1.

FIG. 7 illustrates a skeleton structure of a human model 300 to be detected at this time, and FIGS. 8 to 10 each illustrate a detection example of the skeleton structure. The skeleton structure detection unit 102 detects the skeleton structure of the human model (two-dimensional skeleton model) 300 as in FIG. 7 from a two-dimensional image by using a skeleton estimation technique such as OpenPose. The human model 300 is a two-dimensional model formed of a keypoint such as a joint of a person and a bone connecting each keypoint.

For example, the skeleton structure detection unit 102 extracts a feature point that may be a keypoint from an image, refers to information acquired by machine learning on the image of the keypoint, and detects each keypoint of a person. In the example in FIG. 7, as a keypoint of a person, a head A1, a neck A2, a right shoulder A31, a left shoulder A32, a right elbow A41, a left elbow A42, a right hand A51, a left hand A52, a right waist A61, a left waist A62, a right knee A71, a left knee A72, a right foot A81, and a left foot A82 are detected. Further, as a bone of the person connecting the keypoints, a bone B1 connecting the head A1 and the neck A2, a bone B21 connecting the neck A2 and the right shoulder A31, a bone B22 connecting the neck A2 and the left shoulder A32, a bone B31 connecting the right shoulder A31 and the right elbow A41, a bone B32 connecting the left shoulder A32 and the left elbow A42, a bone B41 connecting the right elbow A41 and the right hand A51, a bone B42 connecting the left elbow A42 and the left hand A52, a bone B51 connecting the neck A2 and the right waist A61, a bone B52 connecting the neck A2 and the left waist A62, a bone B61 connecting the right waist A61 and the right knee A71, a bone B62 connecting the left waist A62 and the left knee A72, a bone B71 connecting the right knee A71 and the right foot A81, and a bone B72 connecting the left knee A72 and the left foot A82 are detected. The skeleton structure detection unit 102 stores the detected skeleton structure of the person in the database 110.

FIG. 8 is an example of detecting a person in a standing-up state. In FIG. 8, the standing-up person is captured from the front, the bone B1, the bone B51 and the bone B52, the bone B61 and the bone B62, and the bone B71 and the bone B72 that are viewed from the front are each detected without overlapping, and the bone B61 and the bone B71 of a right leg are bent slightly more than the bone B62 and the bone B72 of a left leg.

FIG. 9 is an example of detecting a person in a squatting state. In FIG. 9, the squatting person is captured from a right side, the bone B1, the bone B51 and the bone B52, the bone B61 and the bone B62, and the bone B71 and the bone B72 that are viewed from the right side are each detected, and the bone B61 and the bone B71 of the right leg and the bone B62 and the bone B72 of the left leg are greatly bent and also overlap.

FIG. 10 is an example of detecting a person in a sleeping state. In FIG. 10, the sleeping person is captured from a left obliquely front side, the bone B1, the bone B51 and the bone B52, the bone B61 and the bone B62, and the bone B71 and the bone B72 that are viewed from the left obliquely front side are each detected, and the bone B61 and the bone B71 of the right leg and the bone B62 and the bone B72 of the left leg are bent and also overlap.

Subsequently, as illustrated in FIG. 3, the feature value computation unit 103 computes a feature value of the detected skeleton structure (S103). For example, when a height and an area of a skeleton region are set as a feature value, the feature value computation unit 103 extracts a region including the skeleton structure, and acquires a height (pixel number) and an area (pixel area) of the region. The height and the area of the skeleton region are acquired from coordinates of an end portion of the skeleton region to be extracted and coordinates of a keypoint of the end portion. The feature value computation unit 103 stores the acquired feature value of the skeleton structure in the database 110. Note that, the feature value of the skeleton structure is also used as information indicating a state of a person.

In the example in FIG. 8, a skeleton region including all of the bones is extracted from the skeleton structure of the standing person. In this case, an upper end of the skeleton region is the keypoint A1 of the head, a lower end of the skeleton region is the keypoint A82 of the left foot, a left end of the skeleton region is the keypoint A41 of the right elbow, and a right end of the skeleton region is the keypoint A52 of the left hand. Thus, a height of the skeleton region is acquired from a difference in Y coordinate between the keypoint A1 and the keypoint A82. Further, a width of the skeleton region is acquired from a difference in X coordinate between the keypoint A41 and the keypoint A52, and an area is acquired from the height and the width of the skeleton region.

In the example in FIG. 9, a skeleton region including all of the bones is extracted from 5 the skeleton structure of the squatting person. In this case, an upper end of the skeleton region is the keypoint A1 of the head, a lower end of the skeleton region is the keypoint A81 of the right foot, a left end of the skeleton region is the keypoint A61 of the right waist, and a right end of the skeleton region is the keypoint A51 of the right hand. Thus, a height of the skeleton region is acquired from a difference in Y coordinate between the keypoint A1 and the keypoint A81. Further, a width of the skeleton region is acquired from a difference in X coordinate between the keypoint A61 and the keypoint A51, and an area is acquired from the height and the width of the skeleton region.

In the example of FIG. 10, a skeleton region including all of the bones is extracted from 5 the skeleton structure of the sleeping person. In this case, an upper end of the skeleton region is the keypoint A32 of the left shoulder, a lower end of the skeleton region is the keypoint A52 of the left hand, a left end of the skeleton region is the keypoint A51 of the right hand, and a right end of the skeleton region is the keypoint A82 of the left foot. Thus, a height of the skeleton region is acquired from a difference in Y coordinate between the keypoint A32 and the keypoint A52. Further, a width of the skeleton region is acquired from a difference in X coordinate between the keypoint A51 and the keypoint A82, and an area is acquired from the height and the width of the skeleton region.

Figure 11:
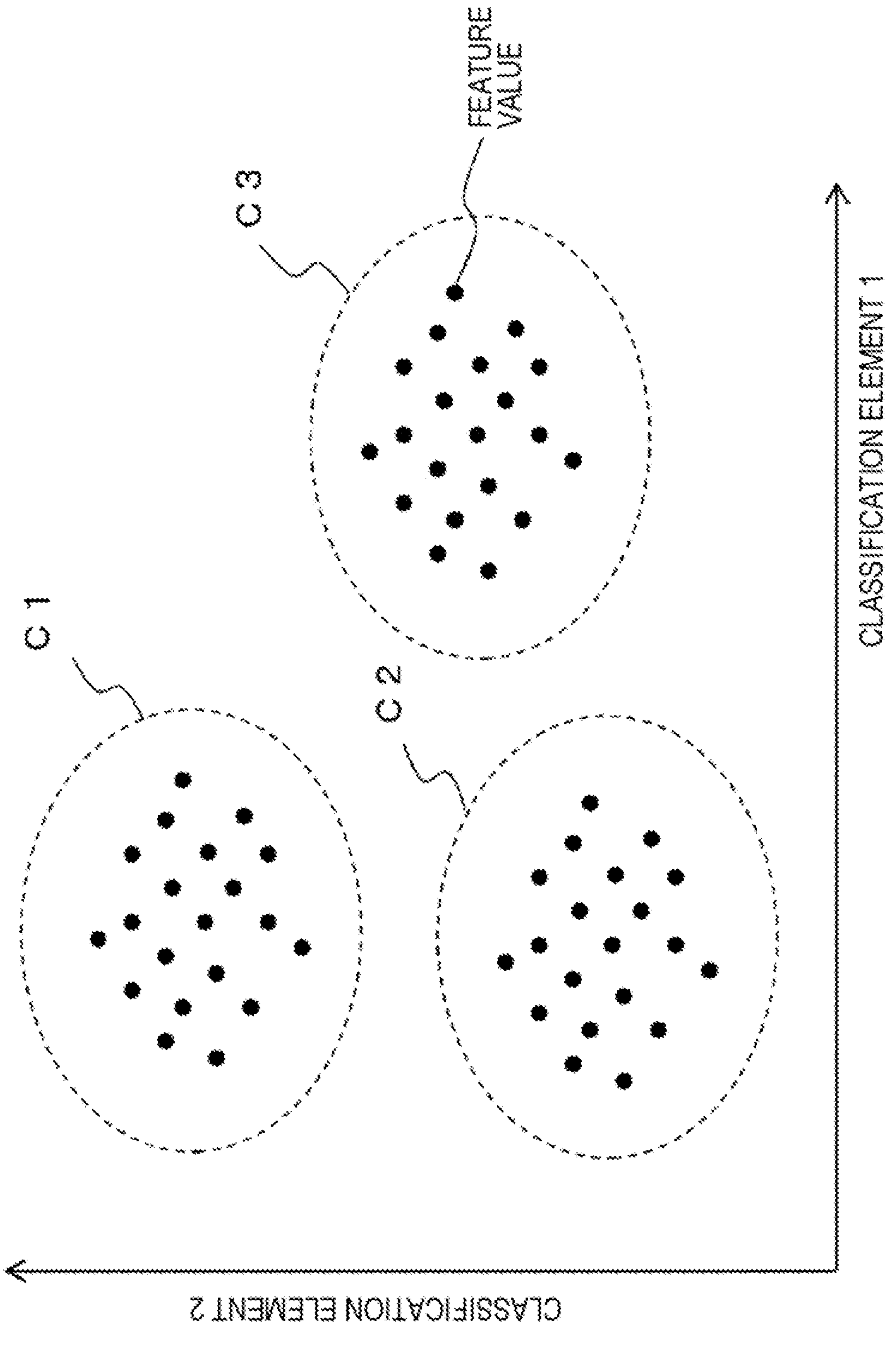
FIG. 11 is a graph illustrating a specific example of the classification method according to the example embodiment 1.

Subsequently, as illustrated in FIG. 3, the classification unit 104 performs classification processing (S104). In the classification processing, as illustrated in FIG. 4, the classification unit 104 computes a degree of similarity of the computed feature value of the skeleton structure (S111), and classifies the skeleton structure, based on the computed feature value (S112). The classification unit 104 acquires a degree of similarity of the feature values among all of the skeleton structures that are classification targets and are stored in the database 110, and classifies (clusters) skeleton structures (poses) having a highest degree of similarity in the same cluster. Further, classification is performed by acquiring a degree of similarity between classified clusters, and classification is repeated until a predetermined number of clusters are acquired. FIG. 11 illustrates an image of a classification result of feature values of the skeleton structures. FIG. 11 is an image of a cluster analysis by two-dimensional classification elements, and two classification elements are, for example, a height of a skeleton region and an area of the skeleton region, or the like. In FIG. 11, as a result of classification, feature values of a plurality of skeleton structures are classified into three clusters C1 to C3. The clusters C1 to C3 are associated with each pose such as, for example, a standing pose, a sitting pose, and a sleeping pose, and skeleton structures (persons) are classified for each similar pose.

In the present example embodiment, various classification methods can be used by classifying based on a feature value of a skeleton structure of a person. Note that, a classification method may be set in advance, or any classification method may be able to set by a user. Further, classification may be performed by the same method as a search method described below. In other words, classification may be performed by a classification condition similar to a search condition. For example, the classification unit 104 performs classification by the following classification methods. Any classification method may be used, or any selected classification method may be combined.

<Classification Method 1>

Classification by a Plurality of Hierarchies

Classification is performed by combining, in a hierarchical manner, classification by a skeleton structure of a whole body, classification by a skeleton structure of an upper body and a lower body, classification by a skeleton structure of an arm and a leg, and the like. In other words, classification may be performed based on a feature value of a first portion or a second portion of a skeleton structure, and further, classification may be performed by assigning a weight to the feature value of the first portion or the second portion.

<Classification Method 2>

Classification by a Plurality of Images Along Time Series

Classification is performed based on a feature value of a skeleton structure in a plurality of images successive in time series. For example, classification may be performed based on a cumulative value by accumulating a feature value in time series direction. Further, classification may be performed based on a change (change value) in a feature value of a skeleton structure in a plurality of successive images.

<Classification Method 3>

Classification by Ignoring the Left and the Right of a Skeleton Structure

Classification is performed on an assumption that reverse skeleton structures on a right side and a left side of a person are the same skeleton structure.

Figure 12:
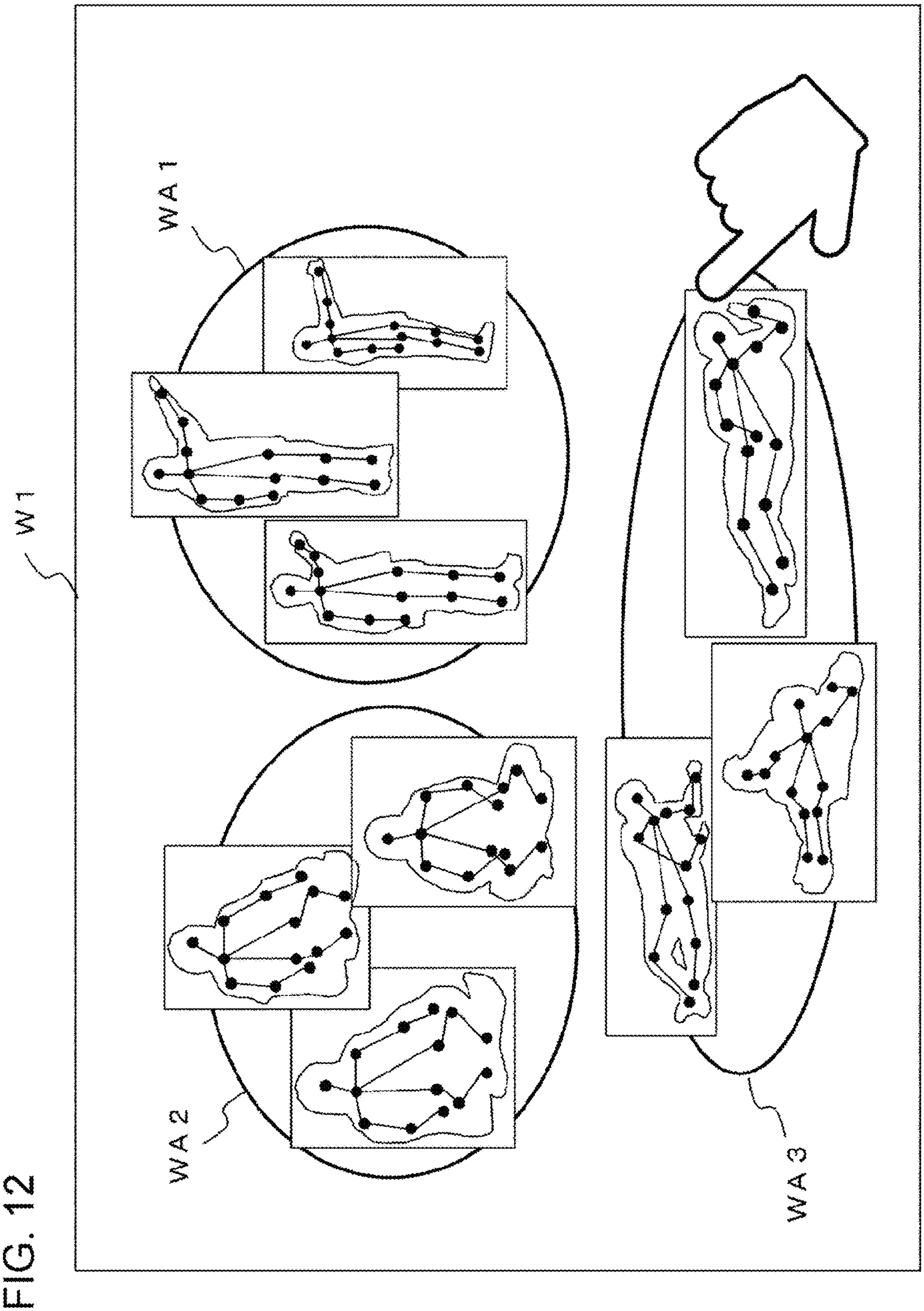
FIG. 12 is a diagram illustrating a display example of a classification result according to the example embodiment 1.

Further, the classification unit 104 displays the classification result of the skeleton structure (S113). The classification unit 104 acquires a necessary image of a skeleton structure and a person from the database 110, and displays, on the display unit 107, the skeleton structure and the person for each similar pose (cluster) as a classification result. FIG. 12 illustrates a display example when poses are classified into three. For example, as illustrated in FIG. 12, pose regions WA1 to WA3 for each pose are displayed on a display window W1, and a skeleton structure and a person (image) of each associated pose are displayed in the pose regions WA1 to WA3. The pose region WA1 is, for example, a display region of a standing pose, and displays a skeleton structure and a person that are classified into the cluster C1 and are similar to the standing pose. The pose region WA2 is, for example, a display region of a sitting pose, and displays a skeleton structure and a person that are classified into the cluster C2 and are similar to the sitting pose. The pose region WA3 is, for example, a display region of a sleeping pose, and displays a skeleton structure and a person that are classified into the cluster C2 C3 and are similar to the sleeping pose.

Subsequently, as illustrated in FIG. 3, the image processing apparatus 100 performs search processing (S105). In the search processing, as illustrated in FIG. 5, the image processing apparatus 100 accepts an input of a search condition (S121).

One example of the processing of S121 will be described by using FIG. 46. When acquiring a keyword accepted in the above-described keyword acceptance processing examples 1 to 4 (S321), the image acquisition unit 101 acquires a candidate of a query image, based on the acquired keyword, the above-described image search processing examples 1 and 2, and the like (S322). Next, the image acquisition unit 101 acquires a query image from among the candidates of the query image, based on the above-described extraction processing examples 1 to 3, and the like (S323).

Next, the skeleton structure detection unit 102 detects a two-dimensional skeleton structure of a person included in each query image (S324). Then, the feature value computation unit 103 computes a feature value of the detected two-dimensional skeleton structure (S325). The feature value of the two-dimensional skeleton structure extracted from the query image becomes a search query.

Returning to FIG. 5, after that, the search unit 105 searches for a skeleton structure, based on the search condition (S122). With the skeleton structure specified by a user as the search query, the search unit 105 searches for a skeleton structure having a high degree of similarity of a feature value from among the skeleton structures that are search targets and are stored in the database 110. The search unit 105 computes a degree of similarity between a 5 feature value of the skeleton structure being the search query and a feature value of the skeleton structure of the search target (a feature value of the skeleton structure extracted from an analysis target image), and extracts a skeleton structure having the computed degree of similarity higher than a predetermined threshold value. The feature value of the skeleton structure being the search query may use a feature value being computed in advance, or may use a feature value being acquired during a search. Note that, the search query may be input by moving each portion of a skeleton structure in response to an operation of a user, or a pose demonstrated by a user in front of a camera may be set as the search query.

In the present example embodiment, similar to the classification methods, various search methods can be used by searching, based on a feature value of a skeleton structure of a person. Note that, a search method may be set in advance, or any search method may be able to be set by a user. For example, the search unit 105 performs a search by the following search methods. Any search method may be used, or any selected search method may be combined. A search may be performed by combining a plurality of search methods (search conditions) by a logical expression (for example, AND (conjunction), OR (disjunction), NOT (negation)). For example, a search may be performed by setting "(pose with a right hand up) AND (pose with a left foot up)" as a search condition.

<Search Method 1>

Figure 13:
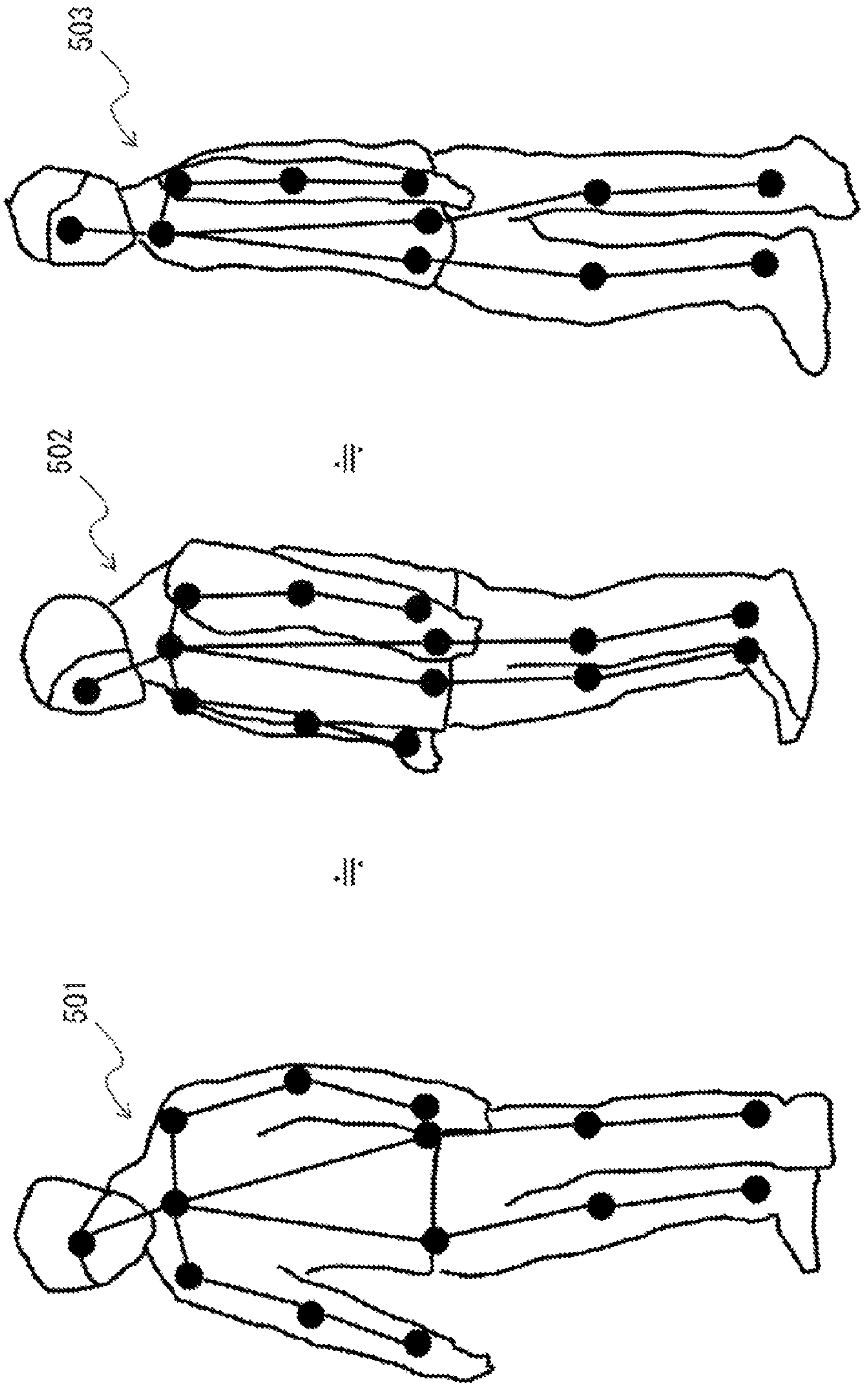
FIG. 13 is a diagram for describing the search method according to the example embodiment 1.

A search only by a feature value in the height direction By searching by using only a feature value in the height direction of a person, an influence of a change in the horizontal direction of the person can be suppressed, and robustness improves with respect to a change in an orientation of the person and a body shape of the person. For example, as in skeleton structures 501 to 503 in FIG. 13, even when an orientation and a body shape of a person are different, a feature value in the height direction does not greatly change. Thus, in the skeleton structures 501 to 503, it can be decided that poses are the same at a time of a search (at a time of classification).

<Search Method 2>

Figure 14:
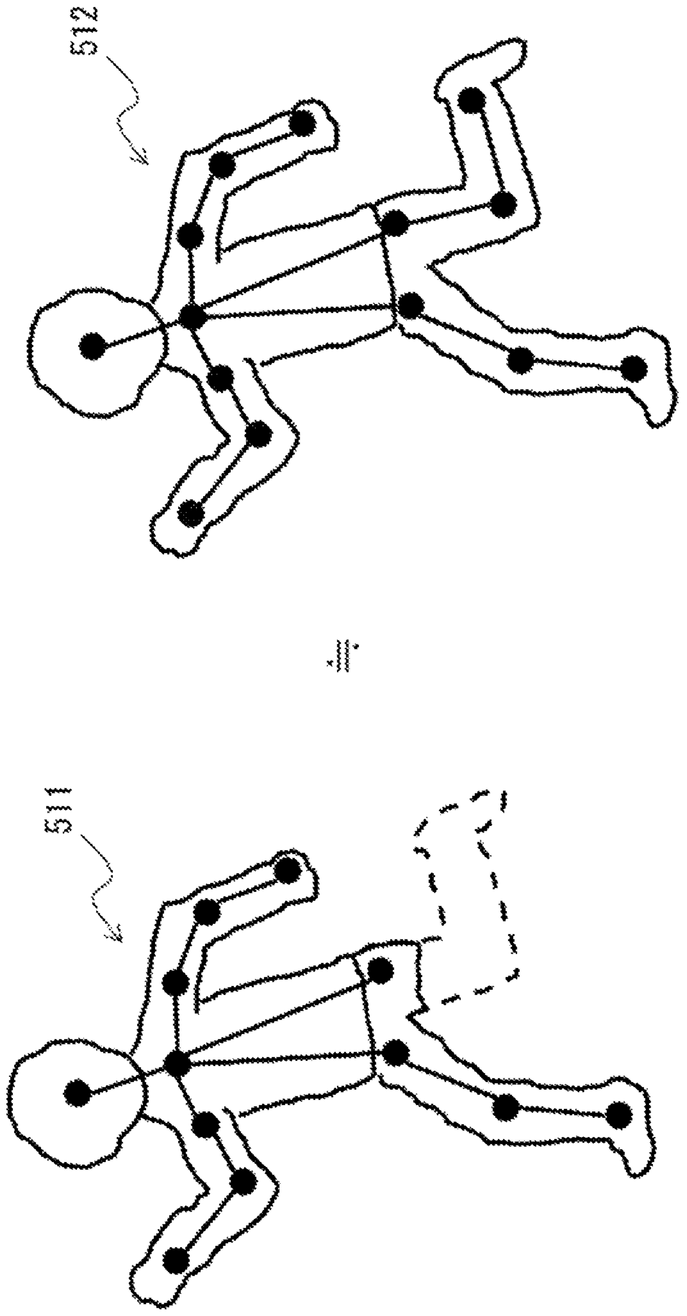
FIG. 14 is a diagram for describing the search method according to the example embodiment 1.
Figure 15:
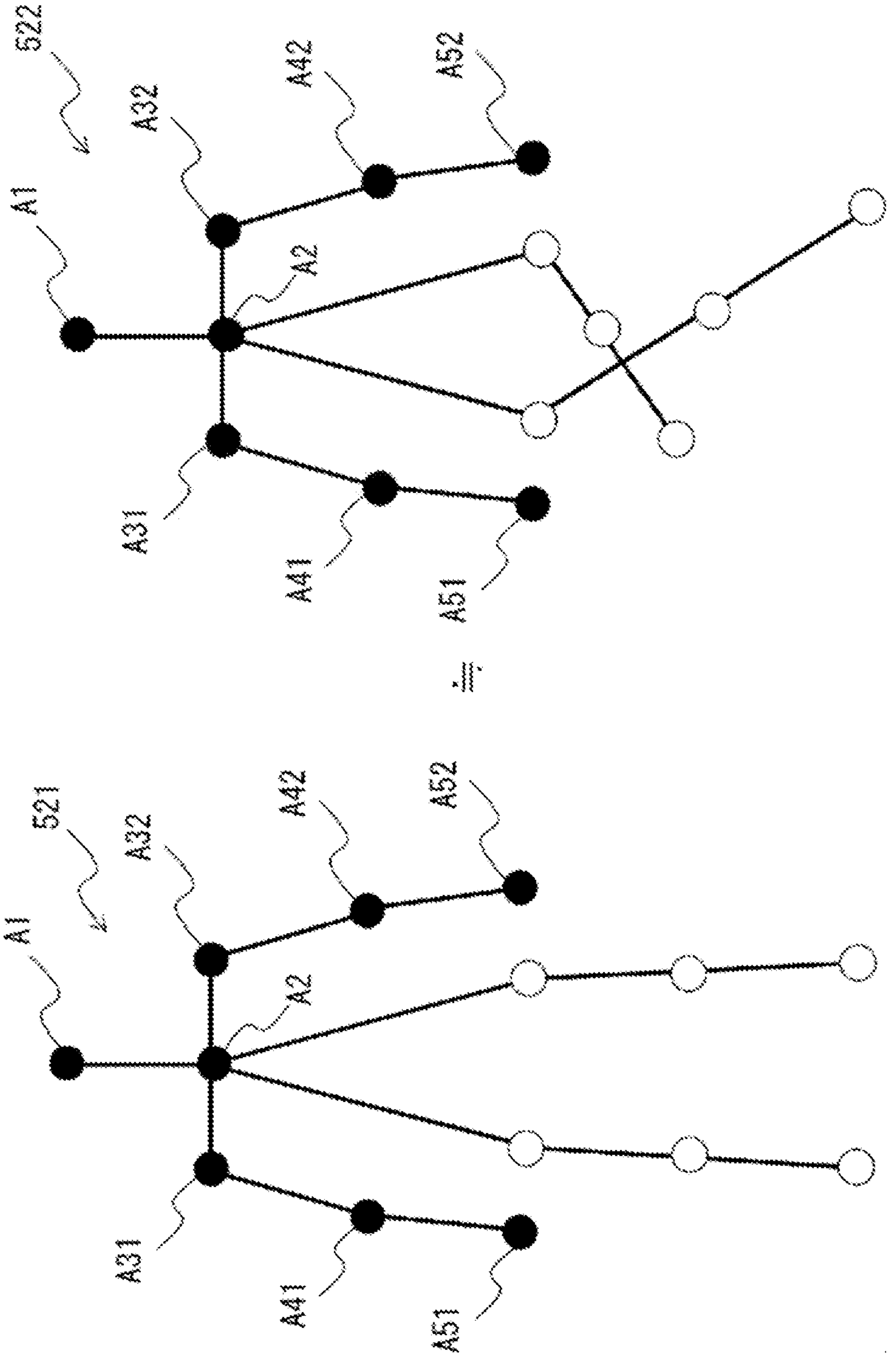
FIG. 15 is a diagram for describing the search method according to the example embodiment 1.

When a part of a body of a person is hidden in a partial search image, a search is performed by using only information about a recognizable portion. For example, as in skeleton structures 511 and 512 in FIG. 14, even when a keypoint of a left foot cannot be detected due to the left foot being hidden, a search can be performed by using a feature value of another detected keypoint. Thus, in the skeleton structures 511 and 512, it can be decided that poses are the 5 same at a time of a search (at a time of classification). In other words, classification and a search can be performed by using a feature value of some of keypoints instead of all keypoints. In an example of skeleton structures 521 and 522 in FIG. 15, although orientations of both feet are different from each other, it can be decided that poses are the same by setting a feature value of keypoints (A1, A2, A31, A32, A41, A42, A51, and A52) of an upper body as a search query. Further, a search may be performed by assigning a weight to a portion (feature point) desired to be searched, or a threshold value of a similarity degree determination may be changed. When a part of a body is hidden, a search may be performed by ignoring the hidden portion, or a search may be performed by taking the hidden portion into consideration. By searching also including a hidden portion, a pose in which the same portion is hidden can be searched.

<Search Method 3>

Search by ignoring the left and the right of a skeleton structure

Figure 16:
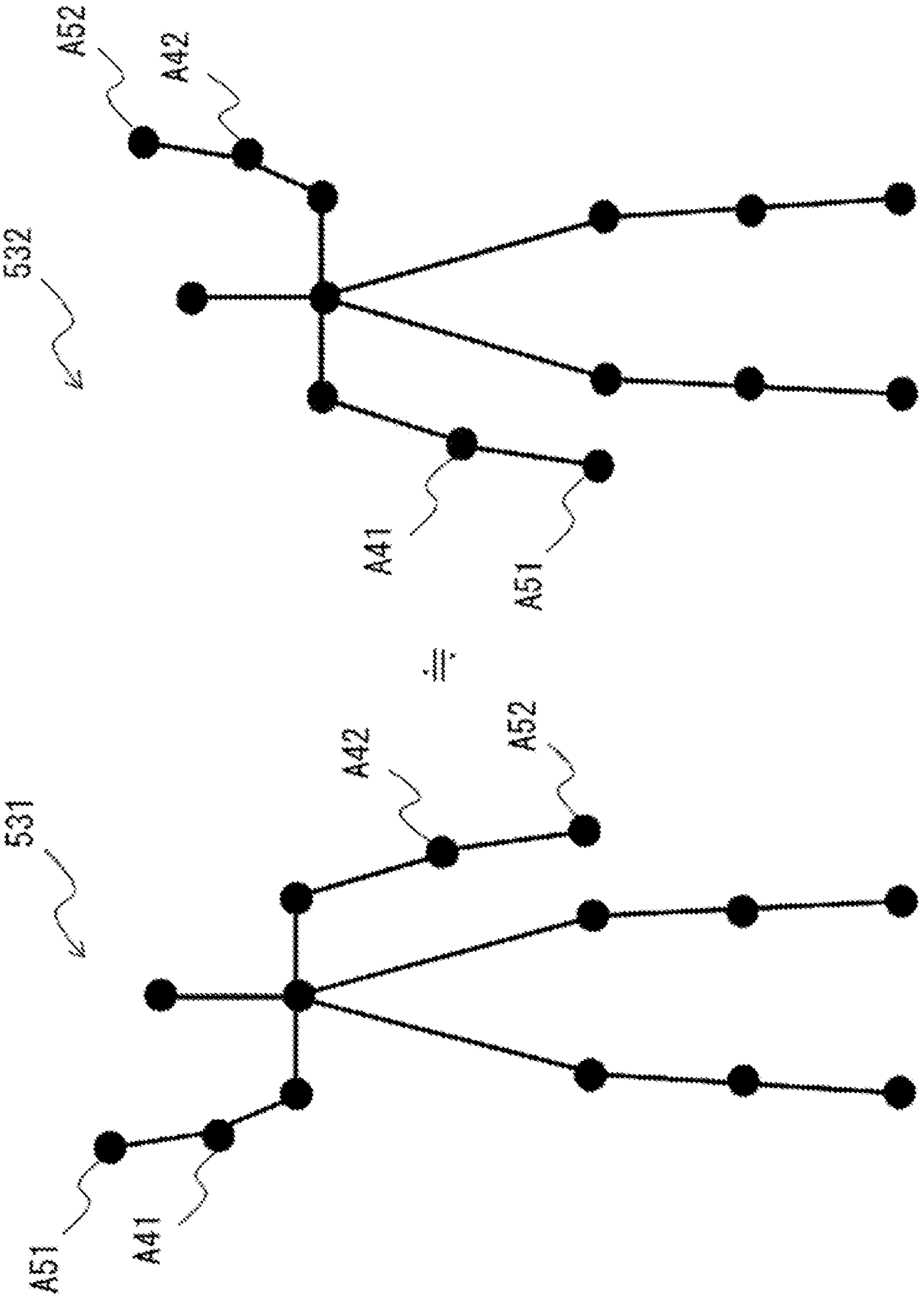
FIG. 16 is a diagram for describing the search method according to the example embodiment 1.

A search is performed on an assumption that reverse skeleton structures on a right side and a left side of a person are the same skeleton structure. For example, as in skeleton structures 531 and 532 in FIG. 16, a pose with a right hand up and a pose with a left hand up can be searched (classified) as the same pose. In the example in FIG. 16, in the skeleton structure 531 and the skeleton structure 532, although positions of the keypoint A51 of the right hand, the keypoint A41 of the right elbow, the keypoint A52 of the left hand, and the keypoint A42 of the left elbow are different, positions of the other keypoints are the same. When the keypoints of one of the skeleton structures of the keypoint A51 of the right hand and the keypoint A41 of the right elbow of the skeleton structure 531, and the keypoint A52 of the left hand and the keypoint A42 of the left elbow of the skeleton structure 532 are reversed to left and right, the keypoints have the same positions of the keypoints of the other skeleton structure, and, when the keypoints of one of the skeleton structures of the keypoint A52 of the left hand and the keypoint A42 of the left elbow of the skeleton structure 531, and the keypoint A51 of the right hand and the keypoint A41 of the right elbow of the skeleton structure 532 are reversed to left and right, the keypoints have the same positions of the keypoints of the other skeleton structure, therefore it is decided that poses are the same.

<Search Method 4>

A search by a feature value in the vertical direction and the horizontal direction After a search is performed only with a feature value of a person in the vertical direction (Y-axis direction), the acquired result is further searched by using a feature value of the person in the horizontal direction (X-axis direction).

<Search Method 5>

A search by a plurality of images along time series

A search is performed based on a feature value of a skeleton structure in a plurality of images successive in time series. For example, a search may be performed based on a cumulative value by accumulating a feature value in time series direction. Further, a search may be performed based on a change (change value) in a feature value of a skeleton structure in a plurality of successive images.

Figure 17:
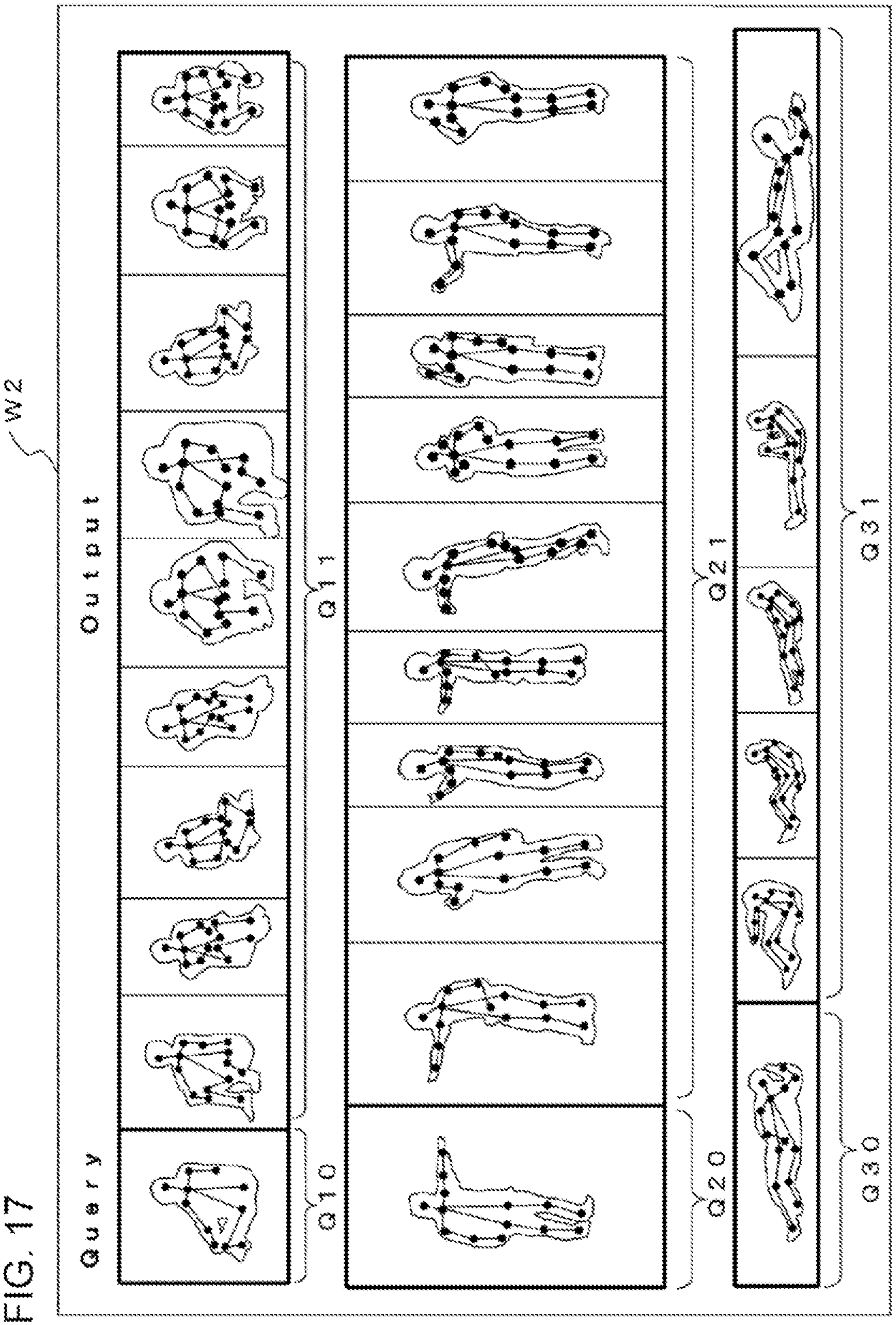
FIG. 17 is a diagram illustrating a display example of a search result according to the example embodiment 1.

Further, the search unit 105 displays a search result of the skeleton structure (S123). The search unit 105 acquires a necessary image of a skeleton structure and a person from the database 110, and displays, on the display unit 107, the acquired skeleton structure and the acquired person as a search result. For example, when a plurality of search queries (search conditions) are specified, a search result is displayed for each of the search queries. FIG. 17 illustrates a display example when search is performed by three search queries (poses). For example, as illustrated in FIG. 17, in a display window W2, skeleton structures and persons of search queries Q10, Q20, and Q30 specified at a left end portion are displayed, and skeleton structures and persons of search results Q11, Q21, and Q31 of the search queries Q10, Q20, and Q30, respectively, are displayed side by side on a right side of the search queries.

An order in which search results are displayed side by side from a next side of a search query may be an order in which a corresponding skeleton structure is found, or may be a decreasing order of a degree of similarity. When a search is performed by assigning a weight to a portion (feature point) in a partial search, display may be performed in an order of a degree of similarity computed by assigning a weight. Display may be performed in an order of a degree of similarity computed only from a portion (feature point) selected by a user. In addition, display may be performed by cutting, for a certain period of time, images (frames) in time series before and after an image (frame) being a search result.

As described above, in the present example embodiment, a skeleton structure of a person can be detected from a two-dimensional image, and classification and a search can be performed based on a feature value of the detected skeleton structure. In this way, classification can be performed for each similar pose having a high degree of similarity, and a similar pose having a high degree of similarity to a search query (search key) can be searched. By classifying and displaying a similar pose from an image, a user can recognize a pose of a person in the image without specifying a pose and the like. Since a user can specify a pose being a search query from a classification result, a desired pose can be searched even when a pose desired to be searched by a user is not recognized in detail in advance. For example, since classification and a search can be performed with a whole or a part of a skeleton structure of a person and the like as a condition, flexible classification and a flexible search can be performed.

Further, in the present example embodiment, the image processing apparatus 100 can search for a query image, based on a keyword, and perform a search for an analysis target image, based on the query image. In this case, a user may input a predetermined keyword, and a trouble of preparing a query image including a person in a desired state by the user can be avoided. As described above, according to the image processing apparatus 100, a user-friendly means for inputting a search query is achieved.

Further, in one example of the present example embodiment, the image processing apparatus 100 can transmit a keyword to a search engine, and acquire a search result of an image based on the keyword from the search engine. In this case, the image processing apparatus 100 is not necessary to perform an image search based on the keyword. As a result, a processing load of the image processing apparatus 100 is reduced. Further, for example, a huge amount of images that are published on the Internet can be used as a search target, therefore a probability of capable of searching for an image including a person in a desired state is increased.

Further, in one example of the present example embodiment, the image processing apparatus 100 can associate a keyword with a part of an analysis target image, and set as an image for a query. By using an analysis target image as an image for a query in this manner, a trouble of preparing an image for a query separately from the analysis target image can be avoided.

Further, in one example of the present example embodiment, the image processing apparatus 100 can output, toward a user, an image searched by a keyword, and use an image selected from the images as a query image. Thus, an image including a person in a state where a user truly desires can be set as a query image. As a result, a search result of the analysis target image based on such a query image is also desired by a user.

Furthermore, in one example of the present example embodiment, the image processing apparatus 100 can search for an image by further using a related word related to an input keyword, and acquire a query image from the searched image. According to the image processing apparatus 100 in such a manner, a possibility that an image including a person in a state where a user truly desires is included in a search result becomes high.

Example Embodiment 2

An example embodiment 2 will be described below with reference to the drawings. In the present example embodiment, a specific example of feature value computation in the example embodiment 1 will be described. In the present example embodiment, a feature value is acquired by normalization by using a height of a person. The other points are similar to those in the example embodiment 1.

Figure 18:
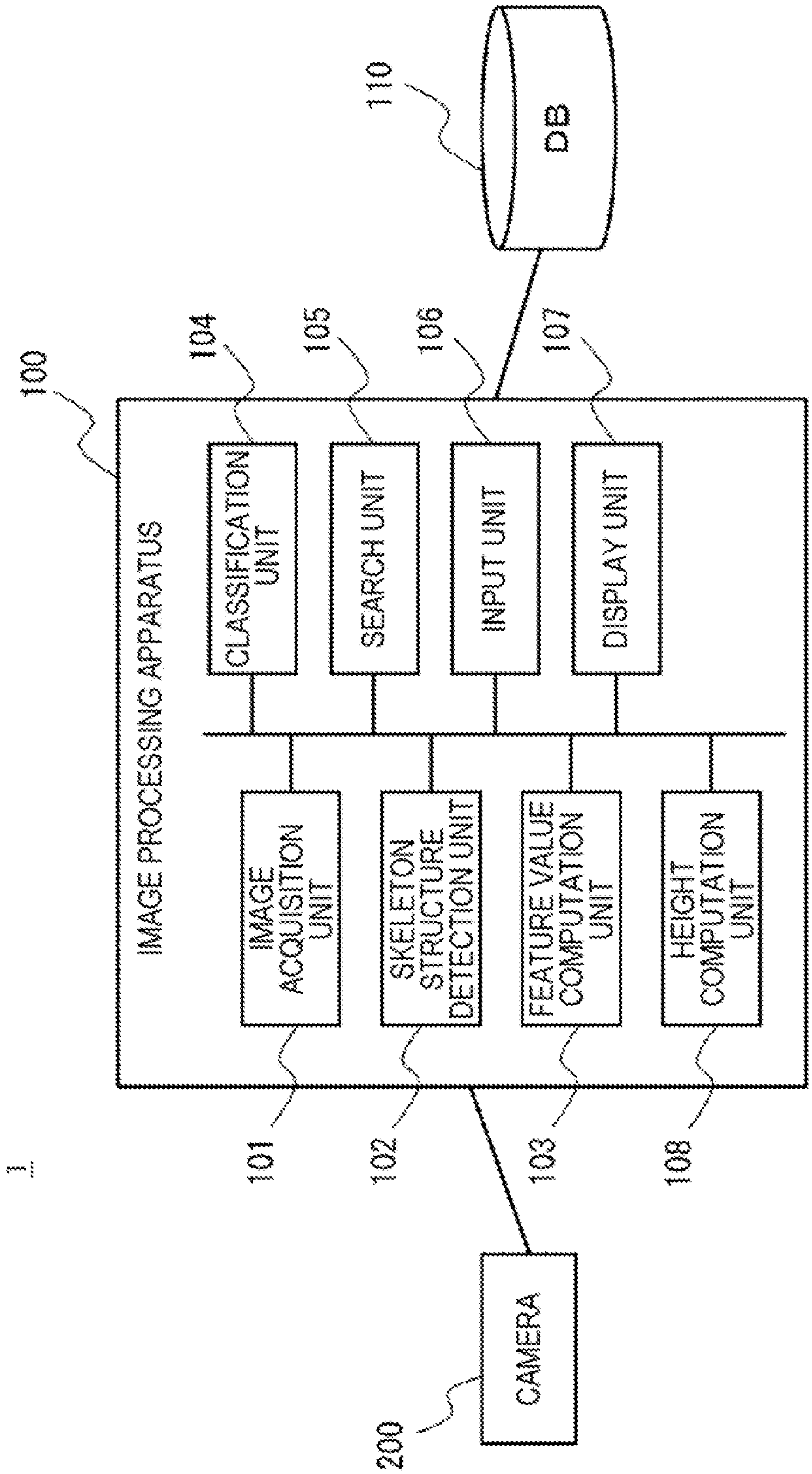
FIG. 18 is a configuration diagram illustrating a configuration of an image 5 processing apparatus according to an example embodiment 2.

FIG. 18 illustrates a configuration of an image processing apparatus 100 according to the present example embodiment. As illustrated in FIG. 18, the image processing apparatus 100 further includes a height computation unit 108 in addition to the configuration in the example embodiment 1. Note that, a feature value computation unit 103 and the height computation unit 108 may serve as one processing unit.

The height computation unit (height estimation unit) 108 computes (estimates) a height (referred to as a height pixel number) of a person in a two-dimensional image when the person stands, based on a two-dimensional skeleton structure detected by a skeleton structure detection unit 102. It can be said that the height pixel number is a height of a person in a two-dimensional image (a length of a whole body of a person on a two-dimensional image space). The height computation unit 108 acquires a height pixel number (pixel number) from a length (length on the two-dimensional image space) of each bone of a detected skeleton structure.

In the following examples, specific examples 1 to 3 are used as a method for acquiring a height pixel number. Note that, any method of the specific examples 1 to 3 may be used, or a plurality of any selected methods may be combined and used. In the specific example 1, a height pixel number is acquired by adding up lengths of bones from a head to a foot among bones of a skeleton structure. When the skeleton structure detection unit 102 (skeleton estimation technique) does not output a top of a head and a foot, a correction can also be performed by multiplication by a constant as necessary. In the specific example 2, a height pixel number is computed by using a human model indicating a relationship between a length of each bone and a length of a whole body (a height on the two-dimensional image space). In the specific example 3, a height pixel number is computed by fitting (applying) a three-dimensional human model to a two-dimensional skeleton structure.

The feature value computation unit 103 according to the present example embodiment is a normalization unit that normalizes a skeleton structure (skeleton information) of a person, based on a computed height pixel number of the person. The feature value computation unit 103 stores a feature value (normalization value) of the normalized skeleton structure in a database 110. The feature value computation unit 103 normalizes, by the height pixel number, a height on an image of each keypoint (feature point) included in the skeleton structure. In the present example embodiment, for example, a height direction is an up-down direction (Y-axis direction) in a two-dimensional coordinate (X-Y coordinate) space of an image. In this case, a height of a keypoint can be acquired from a value (pixel number) of a Y coordinate of the keypoint. Alternatively, a height direction may be a direction (vertical projection direction) of a vertical projection axis in which a direction of a vertical axis perpendicular to the ground (reference surface) in a three-dimensional coordinate space in a real world is projected in the two-dimensional coordinate space. In this case, a height of a keypoint can be acquired by acquiring a vertical projection axis in which an axis perpendicular to the ground in the real world is projected in the two-dimensional coordinate space, based on a camera parameter, and being acquired from a value (pixel number) along the vertical projection axis. Note that, the camera parameter is a capturing parameter of an image, and, for example, the camera parameter is a pose, a position, a capturing angle, a focal distance, and the like of a camera 200. The camera 200 captures an image of an object whose length and position are clear in advance, and a camera parameter can be acquired from the image. A strain may occur at both ends of the captured image, and there is a case where the vertical direction in the real world and the up-down direction in the image do not match. In contrast, an extent that the vertical direction in the real world is tilted in an image is clear by using a parameter of a camera that captures the image. Thus, a feature value of a keypoint can be acquired in consideration of a difference between the real world and the image by normalizing, by a height, a value of the keypoint along a vertical projection axis projected in the image, based on the camera parameter. Note that, a left-right direction (a horizontal direction) is a direction (X-axis direction) of left and right in a two-dimensional coordinate (X-Y coordinate) space of an image, or is a direction in which a direction parallel to the ground in the three-dimensional coordinate space in the real world is projected in the two-dimensional coordinate space.

Figure 19:
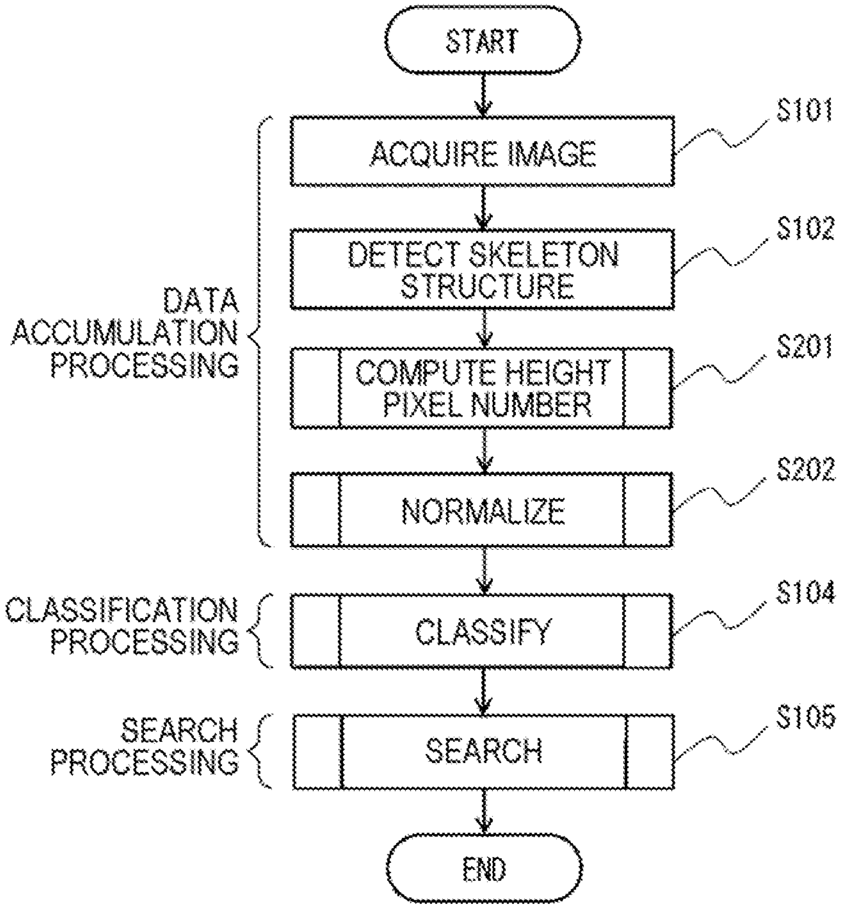
FIG. 19 is a flowchart illustrating an image processing method according to the example embodiment 2.
Figure 20:
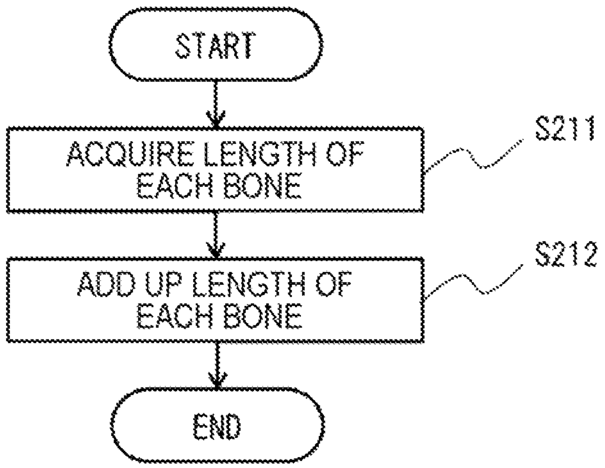
FIG. 20 is a flowchart illustrating a specific example 1 of a height pixel number computation method according to the example embodiment 2.
Figure 21:
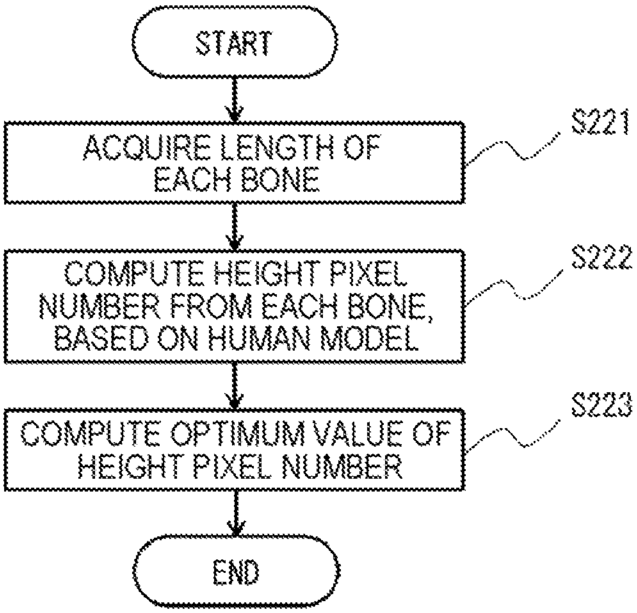
FIG. 21 is a flowchart illustrating a specific example 2 of the height pixel number computation method according to the example embodiment 2.
Figure 22:
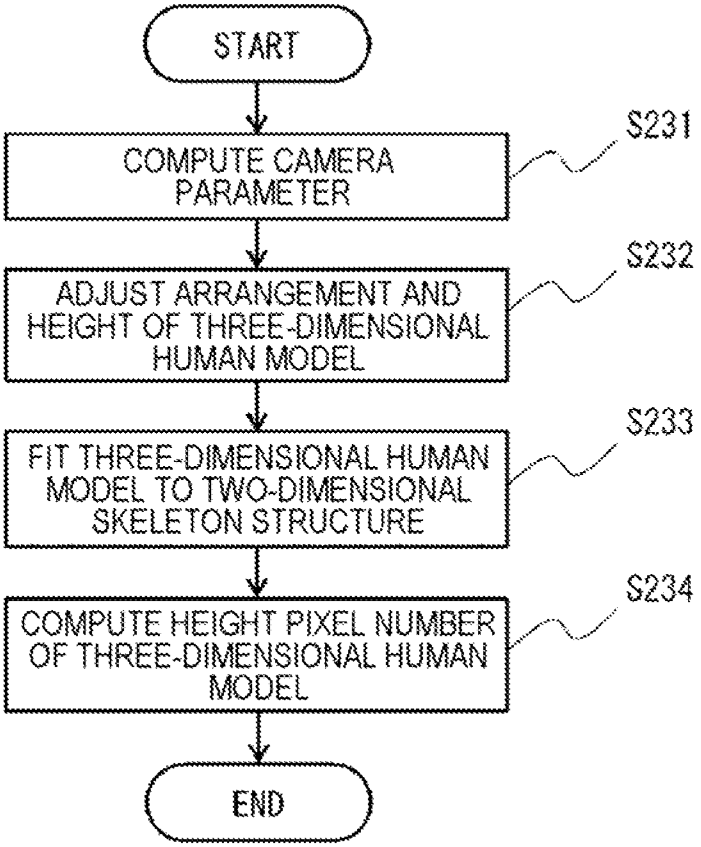
FIG. 22 is a flowchart illustrating the specific example 2 of the height pixel number computation method according to the example embodiment 2.
Figure 23:
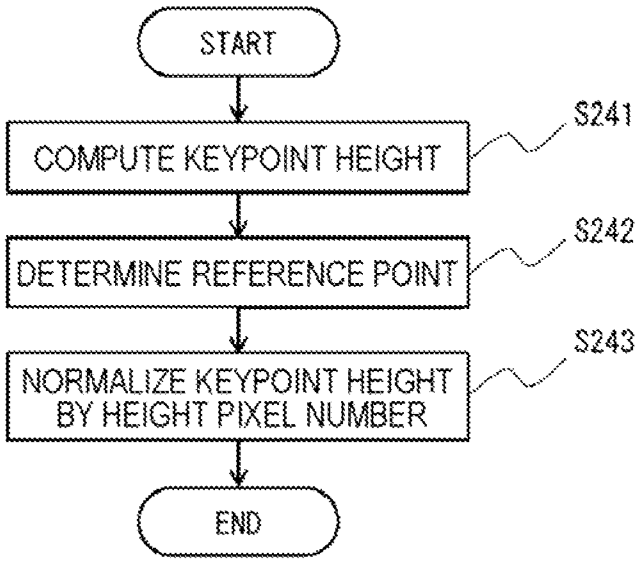
FIG. 23 is a flowchart illustrating a normalization method according to the example embodiment 2.

FIGS. 19 to 23 illustrate operations of the image processing apparatus 100 according to the present example embodiment. FIG. 19 illustrates a flow from image acquisition to search processing in the image processing apparatus 100, FIGS. 20 to 22 illustrate flows of specific examples 1 to 3 of height pixel number computation processing (S201) in FIG. 19, and FIG. 23 illustrates a flow of normalization processing (S202) in FIG. 19.

As illustrated in FIG. 19, in the present example embodiment, the height pixel number computation processing (S201) and the normalization processing (S202) are performed as the feature value computation processing (S103) in the example embodiment 1. The other points are similar to those in the example embodiment 1.

Figure 24:
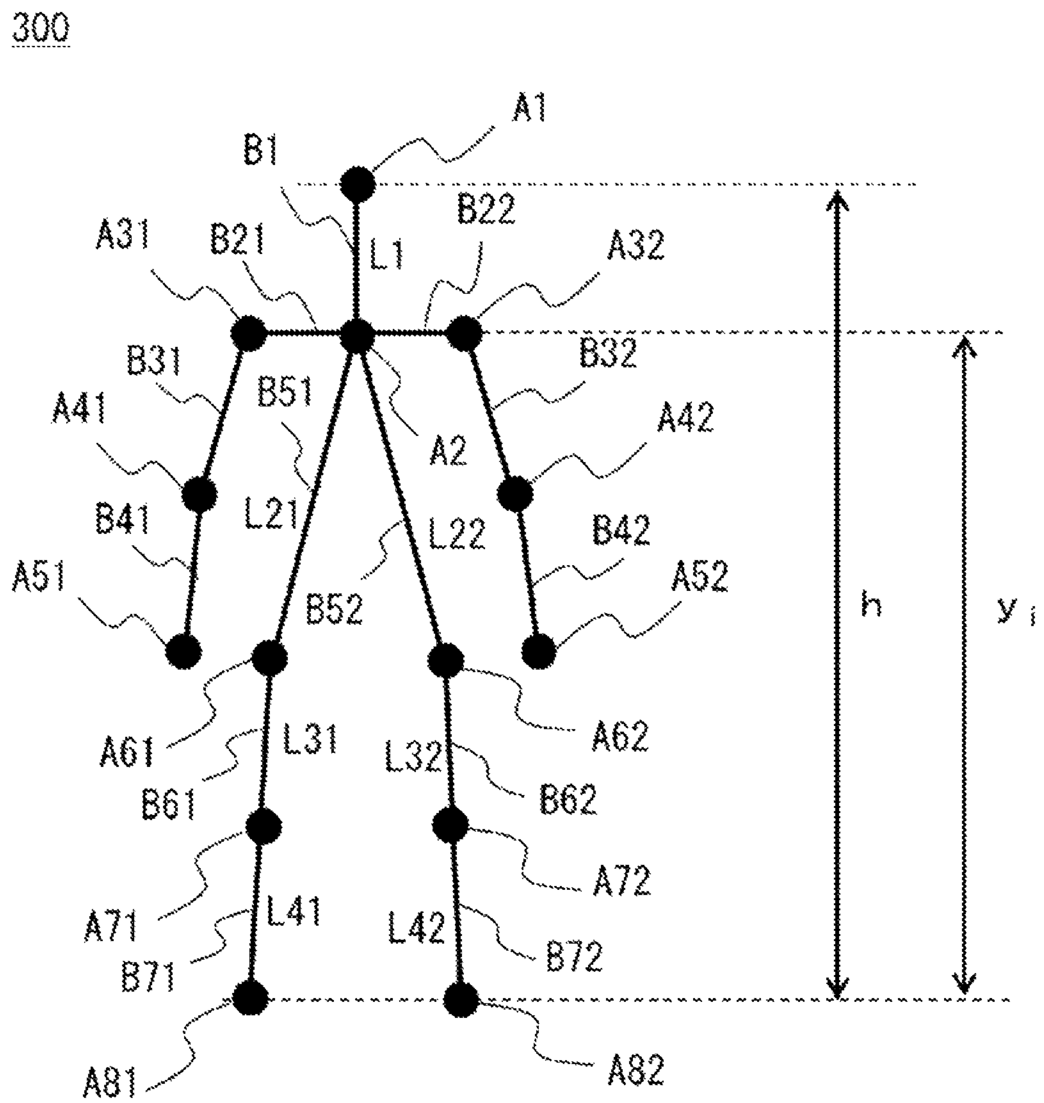
FIG. 24 is a diagram illustrating a human model according to the example embodiment 2.

The image processing apparatus 100 performs the height pixel number computation processing (S201), based on a detected skeleton structure, after the image acquisition (S101) and the skeleton structure detection (S102). In this example, as illustrated in FIG. 24, a height of a skeleton structure of an upright person in an image is a height pixel number (h), and a height of each keypoint of the skeleton structure in a state of the person in the image is a keypoint height ($y_i$). Hereinafter, specific examples 1 to 3 of the height pixel number computation processing will be described.

Specific Example 1

In the specific example 1, a height pixel number is acquired by using a length of a bone from a head to a foot. In the specific example 1, as illustrated in FIG. 20, the height computation unit 108 acquires a length of each bone (S211), and adds up the acquired length of the each bone (S212).

The height computation unit 108 acquires a length of a bone from a head to a foot of a person on a two-dimensional image, and acquires a height pixel number. In other words, each length (pixel number) of a bone B1 (length L1), a bone B51 (length L21), a bone B61 (length L31), and a bone B71 (length L41), or the bone B1 (length L1), a bone B52 (length L22), a bone B62 (length L32), and a bone B72 (length L42) among bones in FIG. 24 is acquired from the image in which the skeleton structure is detected. A length of each bone can be acquired from coordinates of each keypoint in the two-dimensional image. A value acquired by multiplying, by a correction constant, L1+L21+L31+L41 or L1+L22+L32+L42 acquired by adding them up is computed as the height pixel number (h). When both values can be computed, for example, a longer value is set as the height pixel number. In other words, each bone has a longest length in an image when being captured from the front, and is displayed to be short when being tilted in a 5 depth direction with respect to a camera. Therefore, it is conceivable that a longer bone has a higher possibility of being captured from the front, and has a value closer to a true value. Thus, a longer value is preferably selected.

Figure 25:
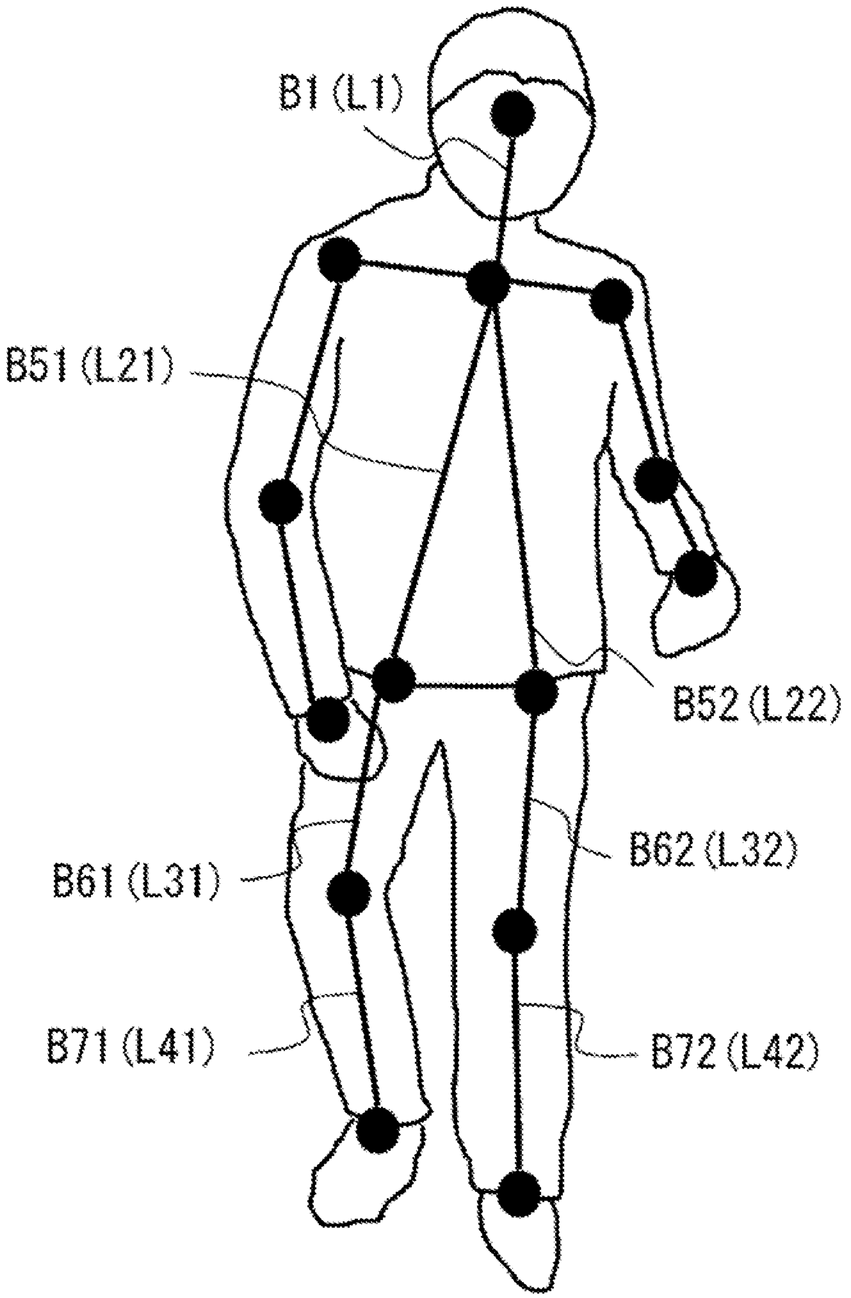
FIG. 25 is a diagram illustrating a detection example of a skeleton structure according to the example embodiment 2.

In an example of FIG. 25, the bone B1, the bone B51 and the bone B52, the bone B61 and the bone B62, and the bone B71 and the bone B72 are each detected without overlapping. L1+L21+L31+L41 and L1+L22+L32+L42 that are a total of the bones are acquired, and, for example, a value acquired by multiplying, by a correction constant, L1+L22+L32+L42 on a left leg side having a greater length of the detected bones is set as the height pixel number.

Figure 26:
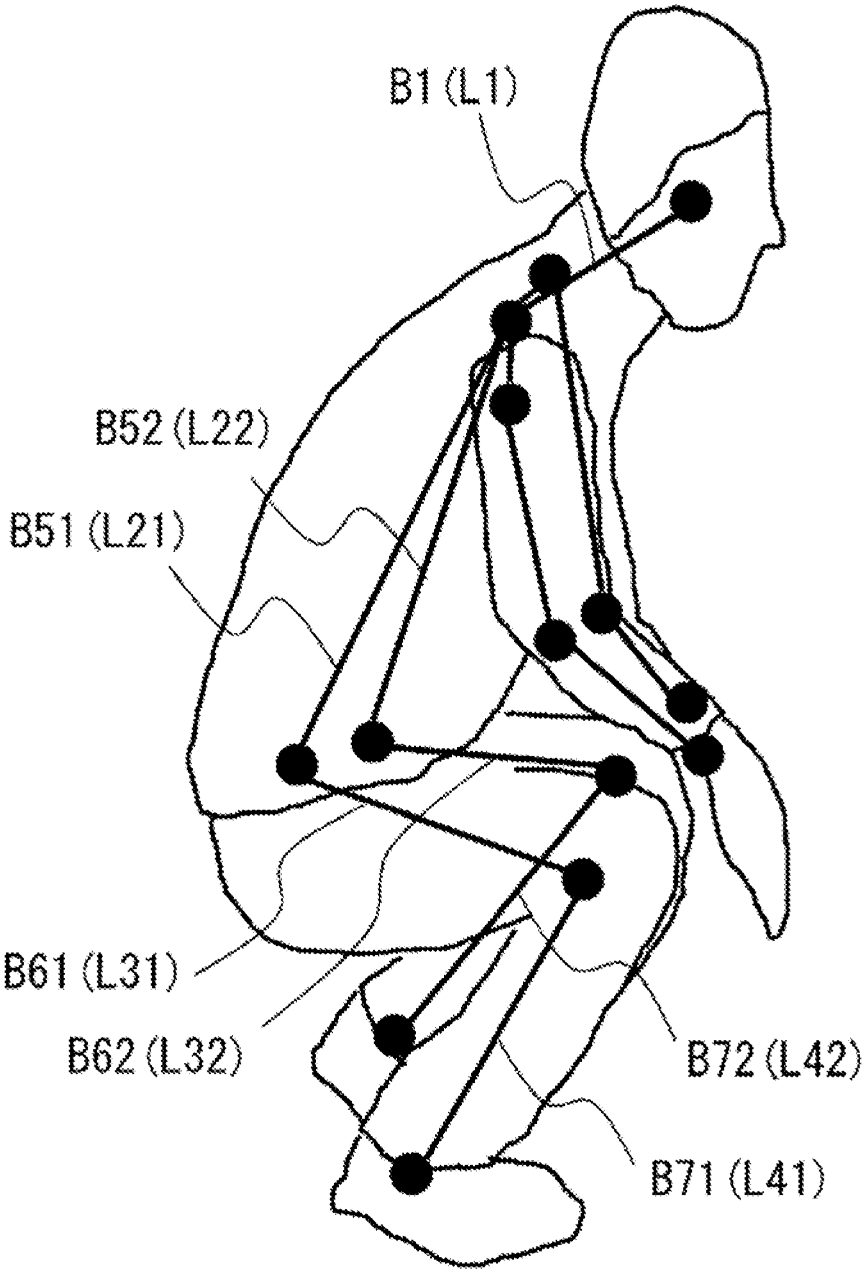
FIG. 26 is a diagram illustrating a detection example of a skeleton structure according to the example embodiment 2.

In an example of FIG. 26, the bone B1, the bone B51 and the bone B52, the bone B61 and the bone B62, and the bone B71 and the bone B72 are each detected, and the bone B61 and the bone B71 of a right leg and the bone B62 and the bone B72 of a left leg overlap. L1+L21+L31+L41 and L1+L22+L32+L42 that are a total of the bones are acquired, and, for example, a value acquired by multiplying, by a correction constant, L1+L21+L31+L41 on a right leg side having a greater length of the detected bones is set as the height pixel number.

Figure 27:
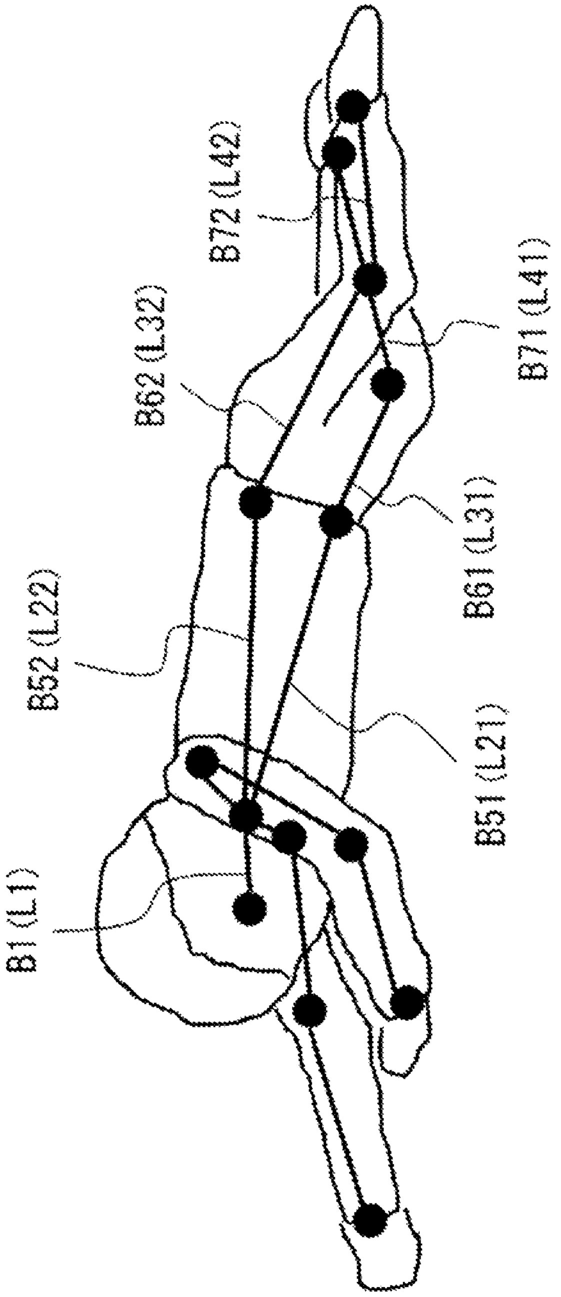
FIG. 27 is a diagram illustrating a detection example of a skeleton structure according to the example embodiment 2.

In an example of FIG. 27, the bone B1, the bone B51 and the bone B52, the bone B61 and the bone B62, and the bone B71 and the bone B72 are each detected, and the bone B61 and the bone B71 of the right leg and the bone B62 and the bone B72 of the left leg overlap. L1+L21+L31+L41 and L1+L22+L32+L42 that are a total of the bones are acquired, and, for example, a value acquired by multiplying, by a correction constant, L1+L22+L32+L42 on the left leg side having a greater length of the detected bones is set as the height pixel number.

In the specific example 1, since a height can be acquired by adding up lengths of bones from a head to a foot, a height pixel number can be acquired by a simple method. Further, since at least a skeleton from a head to a foot may be able to be detected by a skeleton estimation technique using machine learning, a height pixel number can be accurately estimated even when the entire person is not necessarily captured in an image as in a squatting state and the like.

Specific Example 2

In the specific example 2, a height pixel number is acquired by using a two-dimensional skeleton model indicating a relationship between a length of a bone included in a two-dimensional skeleton structure and a length of a whole body of a person on a two-dimensional image space.

Figure 28:
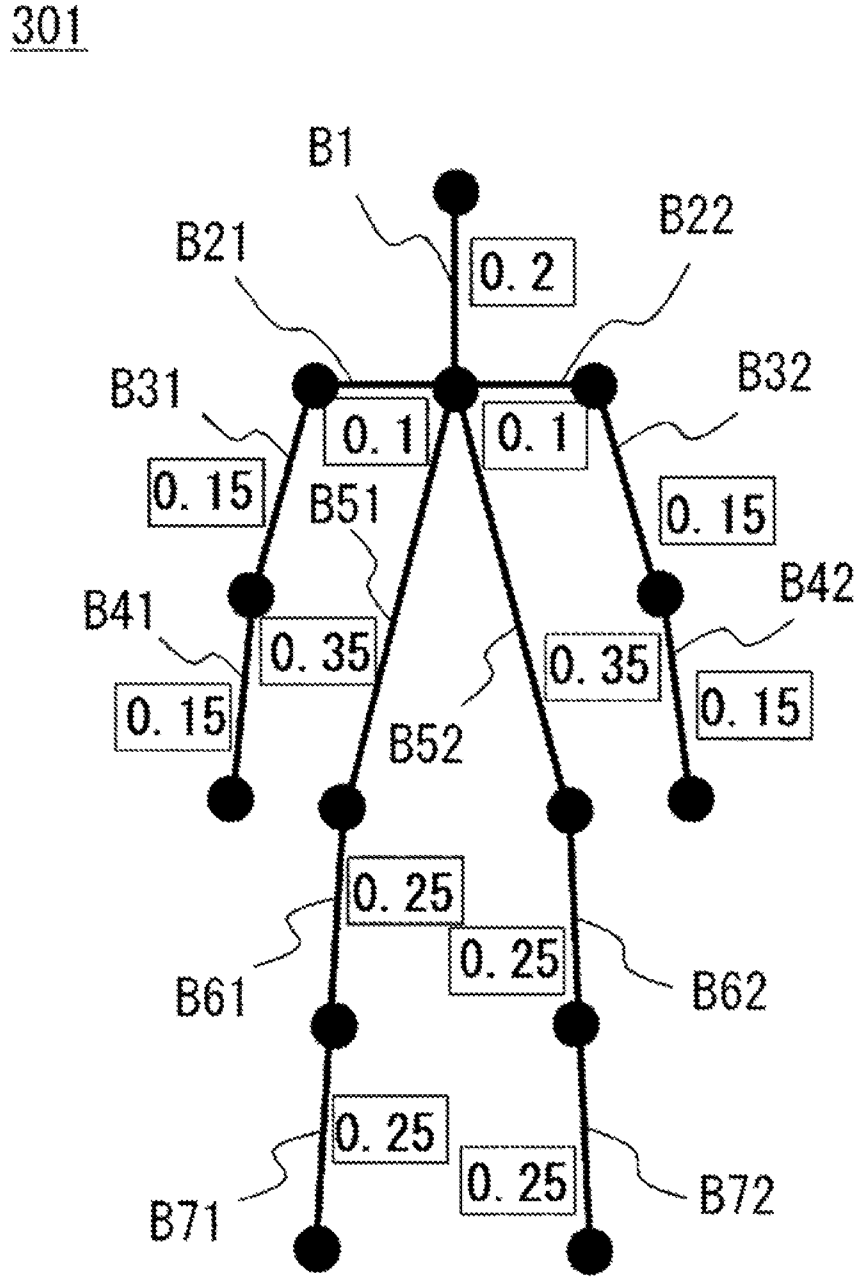
FIG. 28 is a diagram illustrating a human model according to the example embodiment 2.

FIG. 28 is a human model (two-dimensional skeleton model) 301 that is used in the specific example 2 and indicates a relationship between a length of each bone on the two-dimensional image space and a length of a whole body on the two-dimensional image space. As illustrated in FIG. 28, a relationship between a length of each bone of an average person and a length of a whole body (a proportion of a length of each bone to a length of a whole body) is associated with each bone of the human model 301. For example, a length of the bone B1 of a head is the length of the whole body×0.2 (20%), a length of the bone B41 of a right hand is the length of the whole body×0.15 (15%), and a length of the bone B71 of the right leg is the length of the whole body×0.25 (25%). Information about such a human model 301 is stored in the database 110, and thus an average length of a whole body can be acquired from a length of each bone. In addition to a human model of an average person, a human model may be prepared for each attribute of a person such as age, gender, and nationality. In this way, a length (height) of a whole body can be appropriately acquired according to an attribute of a person.

Figure 29:
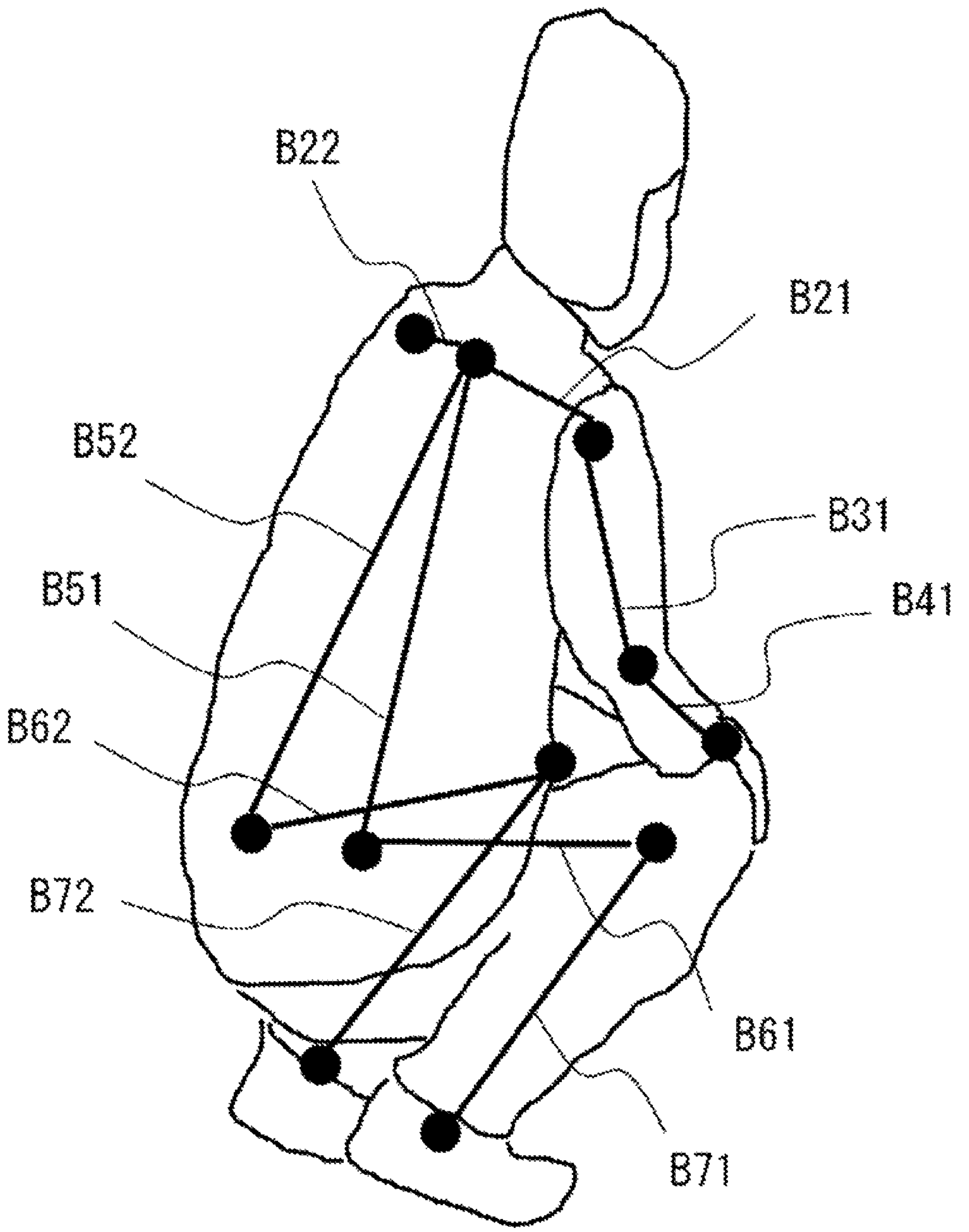
FIG. 29 is a diagram illustrating a detection example of a skeleton structure according to the example embodiment 2.

In the specific example 2, as illustrated in FIG. 21, the height computation unit 108 acquires a length of each bone (S221). The height computation unit 108 acquires a length of all bones (length on the two-dimensional image space) in a detected skeleton structure. FIG. 29 is an example of capturing a person in a squatting state from obliquely behind the right and detecting a skeleton structure. In this example, since a face and a left side surface of a person are not captured, a bone of a head, bones of a left arm and a left hand cannot be detected. Thus, each length of bones B21, B22, B31, B41, B51, B52, B61, B62, B71, and B72 that are detected is acquired.

Subsequently, as illustrated in FIG. 21, the height computation unit 108 computes a height pixel number from a length of each bone, based on a human model (S222). The height computation unit 108 refers to the human model 301 indicating a relationship between lengths of each bone and a whole body as in FIG. 28, and acquires a height pixel number from the length of each bone. For example, since a length of the bone B41 of the right hand is the length of the whole body×0.15, a height pixel number based on the bone B41 is acquired from the length of the bone B41/0.15. Further, since a length of the bone B71 of the right leg is the length of the whole body×0.25, a height pixel number based on the bone B71 is acquired from the length of the bone B71/0.25.

The human model referred to at this time is, for example, a human model of an average person, but the human model may be selected according to attributes of a person such as age, gender, and nationality. For example, when a face of a person is captured in a captured image, an attribute of the person is identified based on the face, and a human model associated with the identified attribute is referred to. An attribute of a person can be recognized from a feature of a face in an image by referring to information acquired by performing machine learning on a face for each attribute. Further, when an attribute of a person cannot be identified from an image, a human model of an average person may be used.

Further, a height pixel number computed from a length of a bone may be corrected by a camera parameter. For example, when a camera is placed in a high position and performs capturing in such a way that a person is looked down, a horizontal length such as a bone of a width of shoulders is not affected by a dip of the camera in a two-dimensional skeleton structure, but a vertical length such as a bone from a neck to a waist is reduced as a dip of the camera increases. Then, a height pixel number computed from the horizontal length such as a bone of a width of shoulders tends to be greater than an actual height pixel number. Thus, when a camera parameter is utilized, an extent of an angle at which a person is looked down by the camera is clear, and thus a correction can be performed in such a way as to acquire a two-dimensional skeleton structure captured from the front by using information about the dip. In this way, a height pixel number can be more accurately computed.

Figure 30:
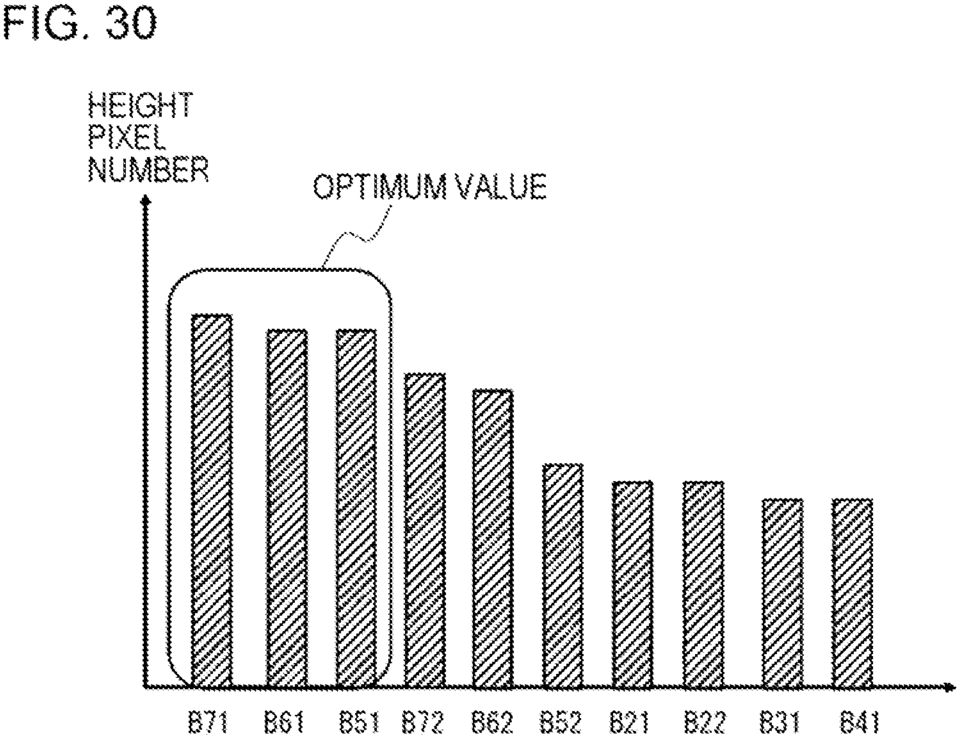
FIG. 30 is a histogram for describing the height pixel number computation method according to the example embodiment 2.

Subsequently, as illustrated in FIG. 21, the height computation unit 108 computes an optimum value of the height pixel number (S223). The height computation unit 108 computes an optimum value of the height pixel number from the height pixel number acquired for each bone. For example, a histogram of a height pixel number acquired for each bone as illustrated in FIG. 30 is generated, and a great height pixel number is selected from among the height pixel numbers. In other words, a longer height pixel number is selected from among a plurality of height pixel numbers acquired based on a plurality of bones. For example, top 30% is set as a valid value, and height pixel numbers by the bones B71, B61, and B51 are selected in FIG. 30. An average of the selected height pixel numbers may be acquired as an optimum value, or a greatest height pixel number may be set as an optimum value. Since a height is acquired from a length of a bone in a two-dimensional image, when the bone cannot be captured from the front, i.e., when the bone tilted in the depth direction as viewed from the camera is captured, a length of the bone is shorter than that captured from the front. Then, a value having a greater height pixel number has a higher possibility of being captured from the front than a value having a smaller height pixel number and is a more plausible value, and thus a greater value is set as an optimum value.

In the specific example 2, since a height pixel number is acquired based on a bone of a detected skeleton structure by using a human model indicating a relationship between lengths of a bone and a whole body on the two-dimensional image space, a height pixel number can be acquired from some of bones even when all skeletons from a head to a foot cannot be acquired. Particularly, a height pixel number can be accurately estimated by adopting a greater value among values acquired from a plurality of bones.

Specific Example 3

In the specific example 3, a skeleton vector of a whole body is acquired by fitting a two-dimensional skeleton structure to a three-dimensional human model (three-dimensional skeleton model) and using a height pixel number of the fit three-dimensional human model.

In the specific example 3, as illustrated in FIG. 22, the height computation unit 108 first computes a camera parameter, based on an image captured by the camera 200 (S231). The height computation unit 108 extracts an object whose length is clear in advance from a plurality of images captured by the camera 200, and acquires a camera parameter from a size (pixel number) of the extracted object. Note that, a camera parameter may be acquired in advance, and the acquired camera parameter may be acquired as necessary.

Subsequently, the height computation unit 108 adjusts an arrangement and a height of a three-dimensional human model (S232). The height computation unit 108 prepares, for a detected two-dimensional skeleton structure, the three-dimensional human model for a height pixel number computation, and arranges the three-dimensional human model in the same two-dimensional image, based on the camera parameter. Specifically, a "relative positional relationship between a camera and a person in a real world" is determined from the camera parameter and the two-dimensional skeleton structure. For example, when assuming that a position of the camera has coordinates (0, 0, 0), coordinates (x, y, z) of a position where a person is standing (or sitting) are determined. Then, by assuming an image captured when the three-dimensional human model is arranged in the same position (x, y, z) as that of the determined person, the two-dimensional skeleton structure and the three-dimensional human model are superimposed.

Figure 31:
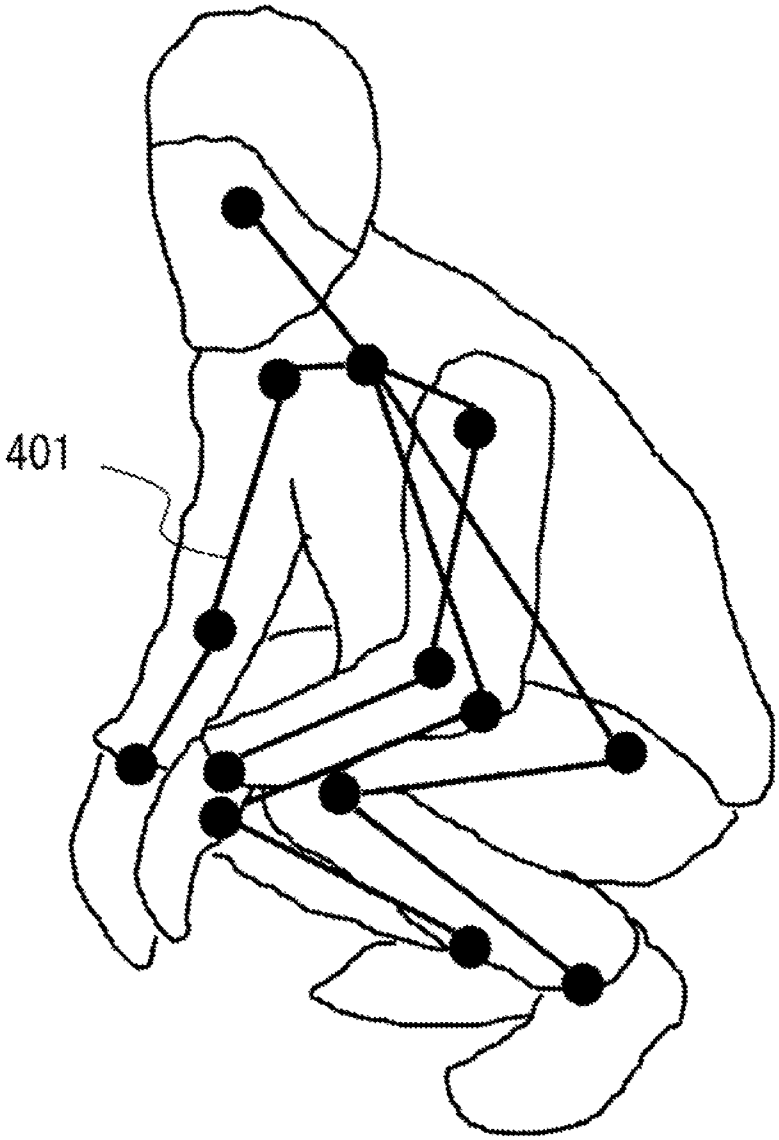
FIG. 31 is a diagram illustrating a detection example of a skeleton structure according to the example embodiment 2.
Figure 32:
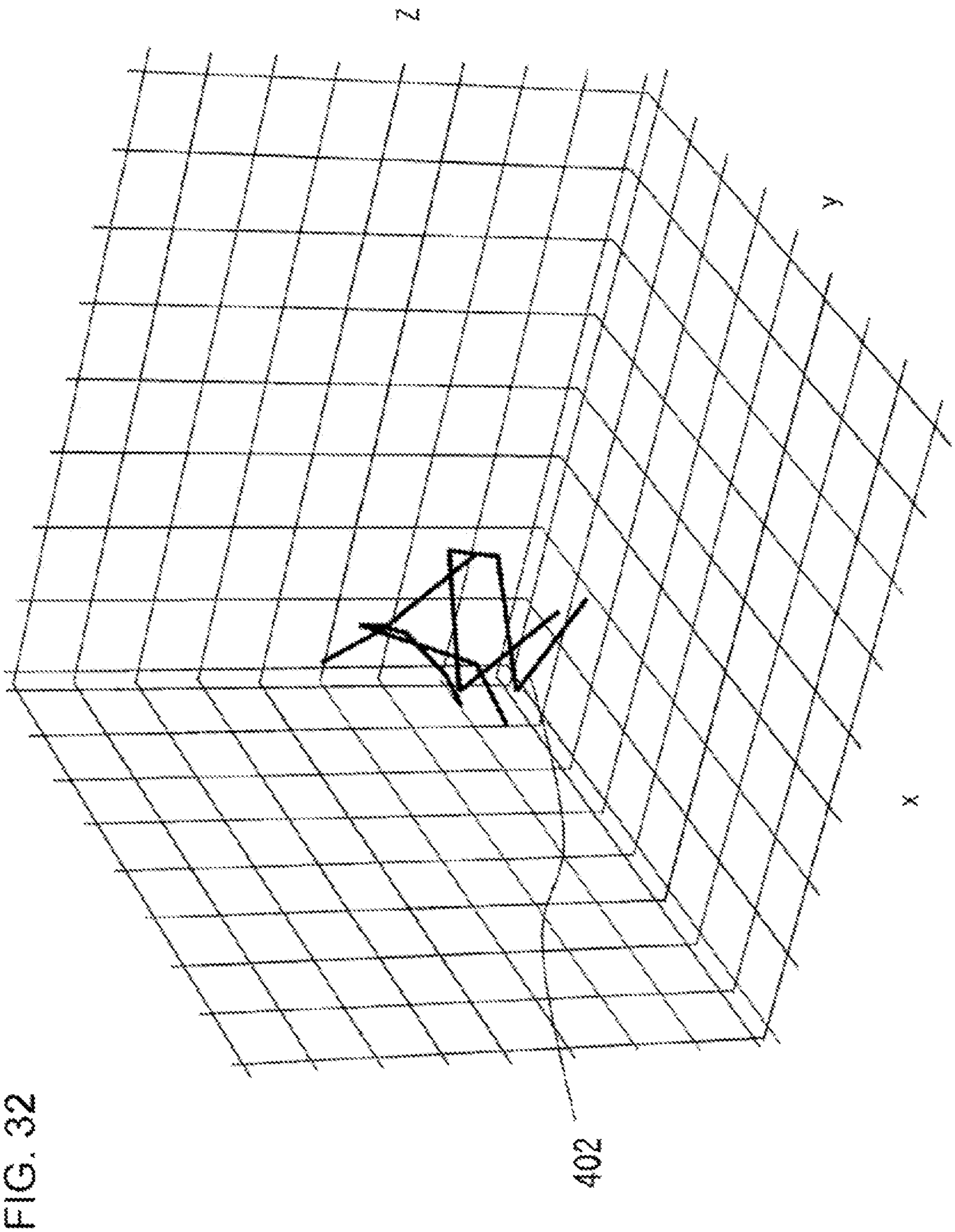
FIG. 32 is a diagram illustrating a three-dimensional human model according to the example embodiment 2.

FIG. 31 is an example of capturing a squatting person from a left oblique front side and detecting a two-dimensional skeleton structure 401. The two-dimensional skeleton structure 401 includes two-dimensional coordinate information. Note that, all of bones are preferably detected, but some of bones may not be detected. A three-dimensional human model 402 as in FIG. 32 is prepared for the two-dimensional skeleton structure 401. The three-dimensional human model (three-dimensional skeleton model) 402 is a model of a skeleton including three-dimensional coordinate information and having the same shape as that of the two-dimensional skeleton structure 401. Then, as in FIG. 33, the prepared three-dimensional human model 402 is arranged and superimposed on the detected two-dimensional skeleton structure 401. Further, the three-dimensional human model 402 is superimposed on the two-dimensional skeleton structure 401, and a height of the three-dimensional human model 402 is also adjusted to the two-dimensional skeleton structure 401.

Figure 33:
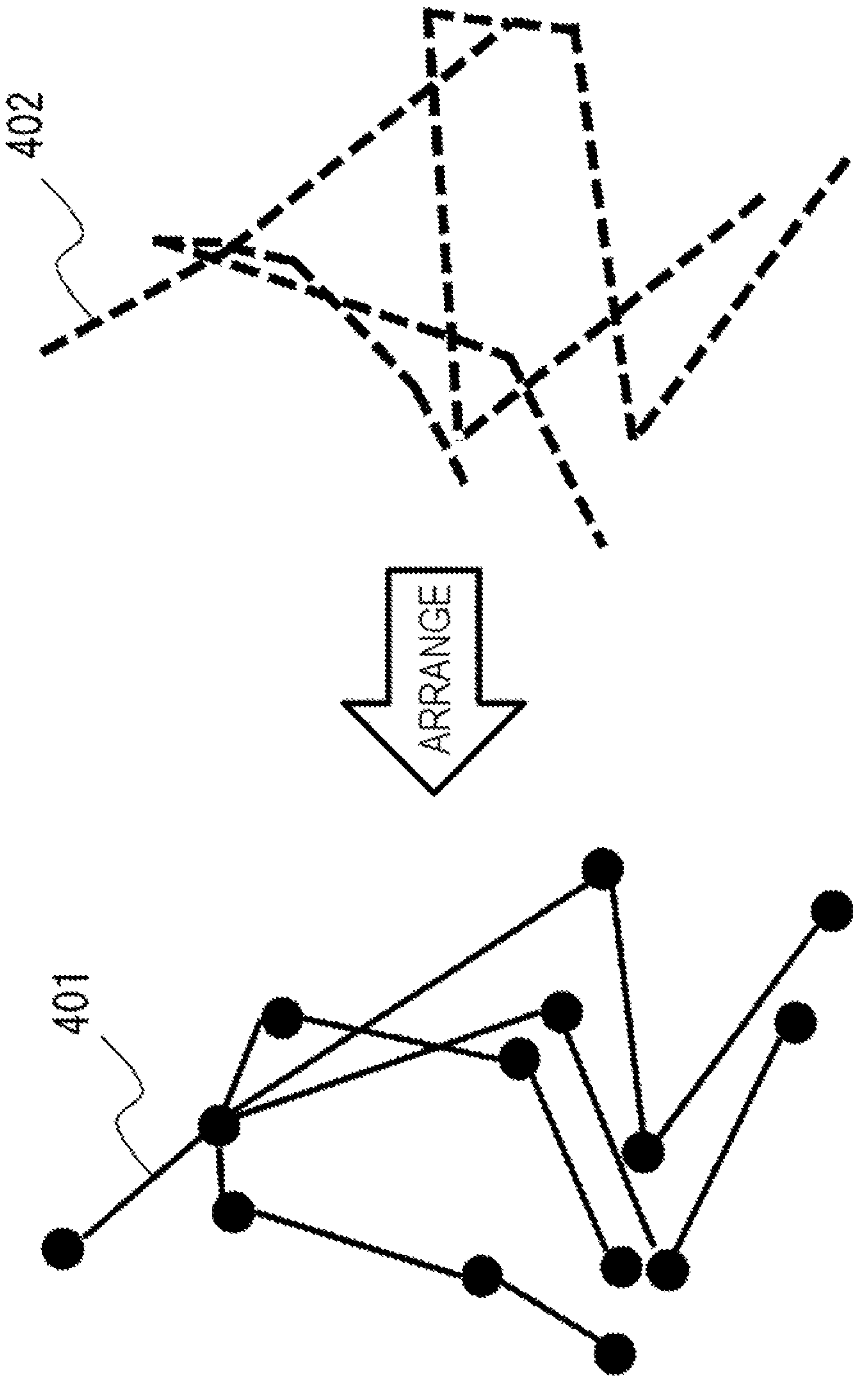
FIG. 33 is a diagram for describing the height pixel number computation method according to the example embodiment 2.

Note that, the three-dimensional human model 402 prepared at this time may be a model in a state close to a pose of the two-dimensional skeleton structure 401 as in FIG. 33, or may be a model in an upright state. For example, the three-dimensional human model 402 with an estimated pose may be generated by using a technique for estimating a pose in a three-dimensional space from a two-dimensional image by using machine learning. A three-dimensional pose can be estimated from a two-dimensional image by learning information about a joint in the two-dimensional image and information about a joint in a three-dimensional space.

Figure 34:
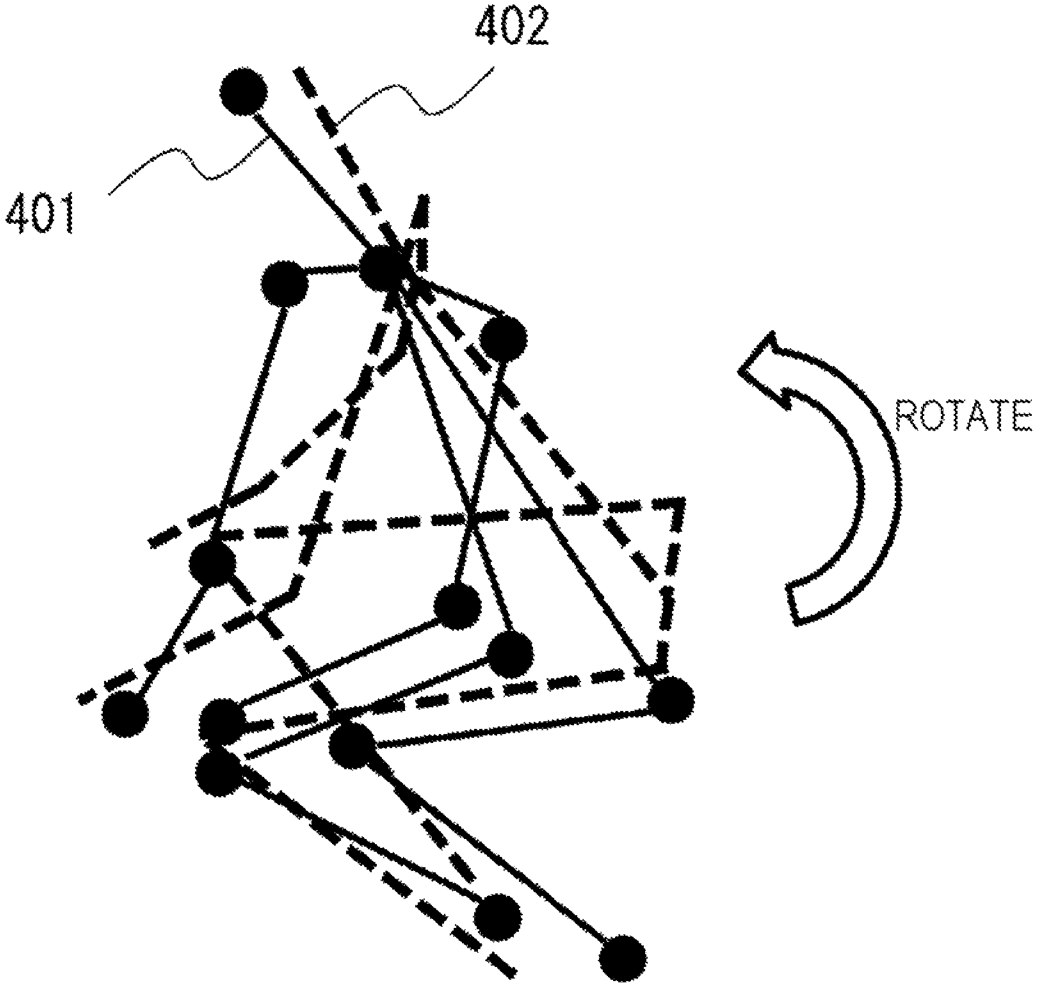
FIG. 34 is a diagram for describing the height pixel number computation method according to the example embodiment 2.

Subsequently, as illustrated in FIG. 22, the height computation unit 108 fits the three-dimensional human model to a two-dimensional skeleton structure (S233). As in FIG. 34, the height computation unit 108 deforms the three-dimensional human model 402 in such a way that poses of the three-dimensional human model 402 and the two-dimensional skeleton structure 401 match in a state where the three-dimensional human model 402 is superimposed on the two-dimensional skeleton structure 401. In other words, a height, an orientation of a body, and an angle of a joint of the three-dimensional human model 402 are adjusted, and optimization is performed in such a way as to eliminate a difference from the two-dimensional skeleton structure 401. For example, by rotating a joint of the three-dimensional human model 402 in a movable range of a person and also rotating the entire three-dimensional human model 402, the entire size is adjusted. Note that, fitting (application) between a three-dimensional human model and a two-dimensional skeleton structure is performed on a two-dimensional space (two-dimensional coordinates). In other words, a three-dimensional human model is mapped to a two-dimensional space, and the three-dimensional human model is optimized for a 5 two-dimensional skeleton structure in consideration of change of the deformed three-dimensional human model in the two-dimensional space (image).

Figure 35:
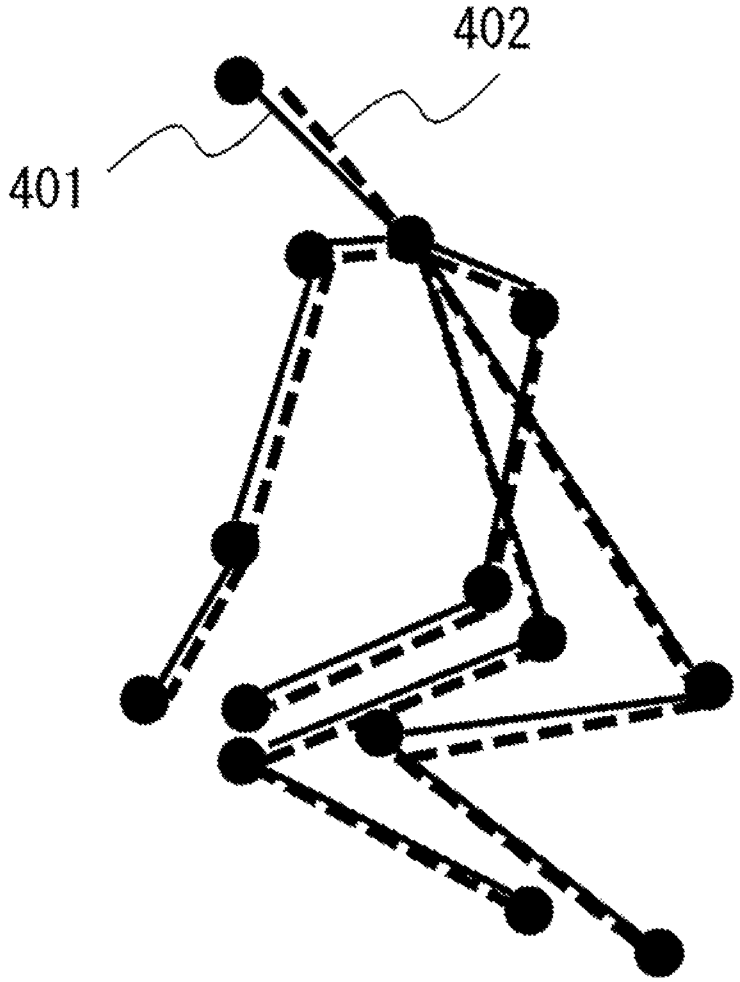
FIG. 35 is a diagram for describing the height pixel number computation method according to the example embodiment 2.

Subsequently, as illustrated in FIG. 22, the height computation unit 108 computes a height pixel number of the fit three-dimensional human model (S234). As in FIG. 35, when there is no difference between the three-dimensional human model 402 and the two-dimensional skeleton structure 401 and poses match, the height computation unit 108 acquires a height pixel number of the three-dimensional human model 402 in the state. With the optimized three-dimensional human model 402 in an upright state, a length of a whole body on the two-dimensional space is acquired based on a camera parameter. For example, a height pixel 5 number is computed from lengths (pixel numbers) of bones from a head to a foot when the three-dimensional human model 402 is upright. Similarly to the specific example 1, the lengths of the bones from the head to the foot of the three-dimensional human model 402 may be added up.

In the specific example 3, a height pixel number is acquired based on a three-dimensional human model by fitting the three-dimensional human model to a two-dimensional skeleton structure, based on a camera parameter, and thus the height pixel number can be accurately estimated even when all bones are not captured at the front, i.e., when an error is great due to all bones being captured obliquely.

<Normalization Processing>

As illustrated in FIG. 19, the image processing apparatus 100 performs the normalization processing (S202) after the height pixel number computation processing. In the normalization processing, as illustrated in FIG. 23, the feature value computation unit 103 computes a keypoint height (S241). The feature value computation unit 103 computes a keypoint height (pixel number) of all keypoints included in the detected skeleton structure. The keypoint height is a length (pixel number) in the height direction from a lowest end (for example, a keypoint of any foot) of the skeleton structure to the keypoint. Herein, as one example, the keypoint height is acquired from a Y coordinate of the keypoint in an image. Note that, as described above, the keypoint height may be acquired from a length in a direction along a vertical projection axis based on a camera parameter. For example, in the example in FIG. 24, a height ($y_i$) of a keypoint A2 of a neck is a value acquired by subtracting a Y coordinate of a keypoint A81 of a right foot or a keypoint A82 of a left foot from a Y coordinate of the keypoint A2.

Subsequently, the feature value computation unit 103 determines a reference point for normalization (S242). The reference point is a point being a reference for representing a relative height of a keypoint. The reference point may be set in advance, or may be able to be selected by a user. The reference point is preferably at the center of the skeleton structure or higher than the center (in an upper half of an image in the up-down direction), and, for example, coordinates of a keypoint of a neck are set as the reference point. Note that, coordinates of a keypoint of a head or another portion instead of a neck may be set as the reference point. Instead of a keypoint, any coordinates (for example, center coordinates in the skeleton structure, and the like) may be set as the reference point.

Subsequently, the feature value computation unit 103 normalizes the keypoint height ($y_i$) by the height pixel number (S243). The feature value computation unit 103 normalizes each keypoint by using the keypoint height of each keypoint, the reference point, and the height pixel number. Specifically, the feature value computation unit 103 normalizes, by the height pixel number, a relative height of a keypoint with respect to the reference point. Herein, as an example of focusing only on the height direction, only a Y coordinate is extracted, and normalization is performed with the reference point as the keypoint of the neck. Specifically, with a Y coordinate of the reference point (keypoint of the neck) as ($y_c$), a feature value (normalization value) is acquired by using the following equation (1). Note that, when a vertical projection axis based on a camera parameter is used, ($y_i$) and ($y_c$) are converted into values in a direction along the vertical projection axis.

[Mathematics 1]

$$f_i=(y_i-y_c)/h \quad (1)$$

For example, when the number of keypoints is 18, 18 coordinates ($x_0$, $y_0$), ($x_1$, $y_1$), . . . and ($x_{17}$, $y_{17}$) of the keypoints are converted into 18-dimensional feature values as follows by using the above-described equation (1).

[Mathematics 2]

$$f_0 = (y_0 - y_c)/h \quad (2)$$
$$f_1 = (y_1 - y_c)/h$$
$$\vdots$$
$$f_{17} = (y_{17} - y_c)/h$$

Figure 36:
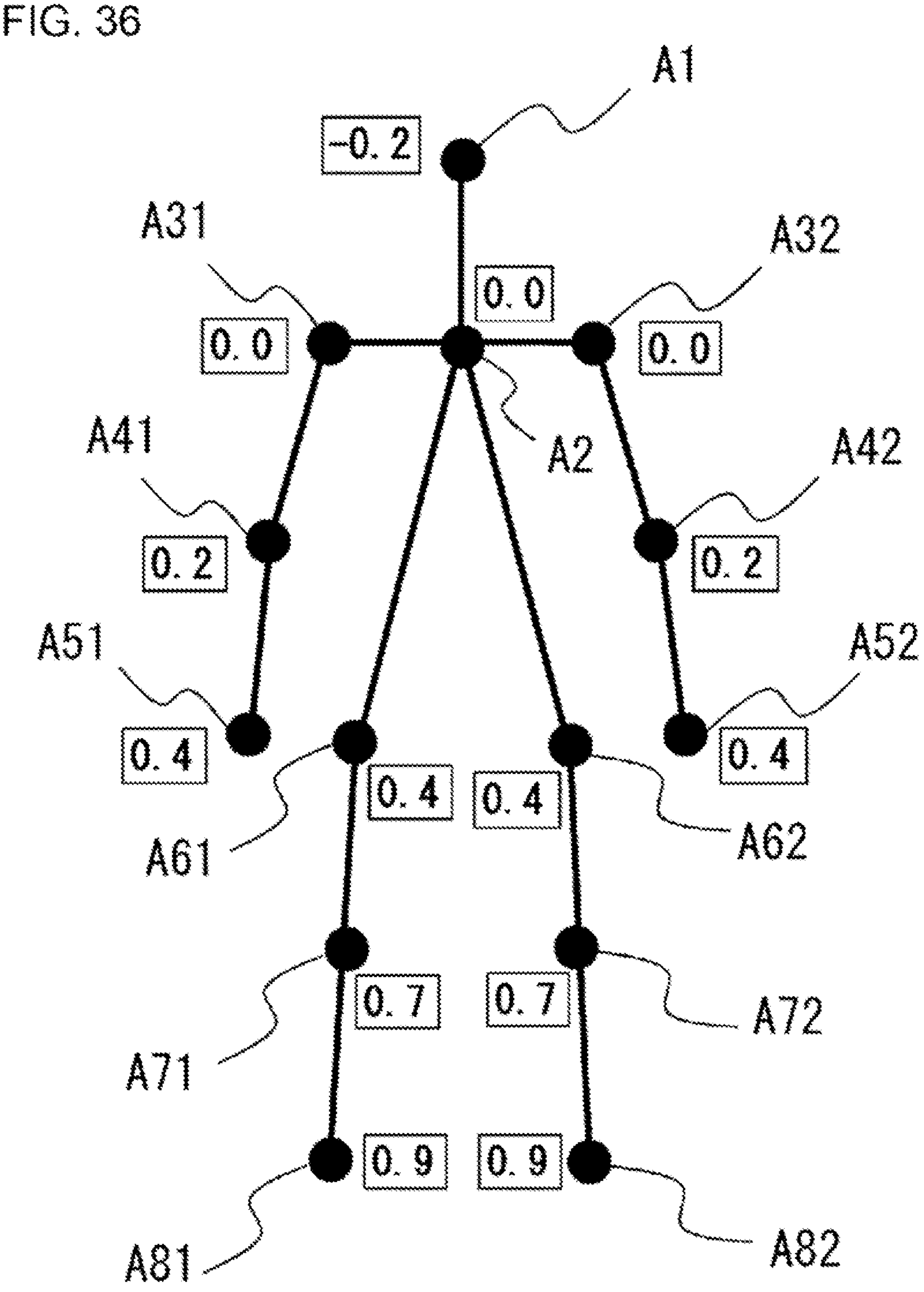
FIG. 36 is a diagram for describing the normalization method according to the example embodiment 2.
Figure 37:
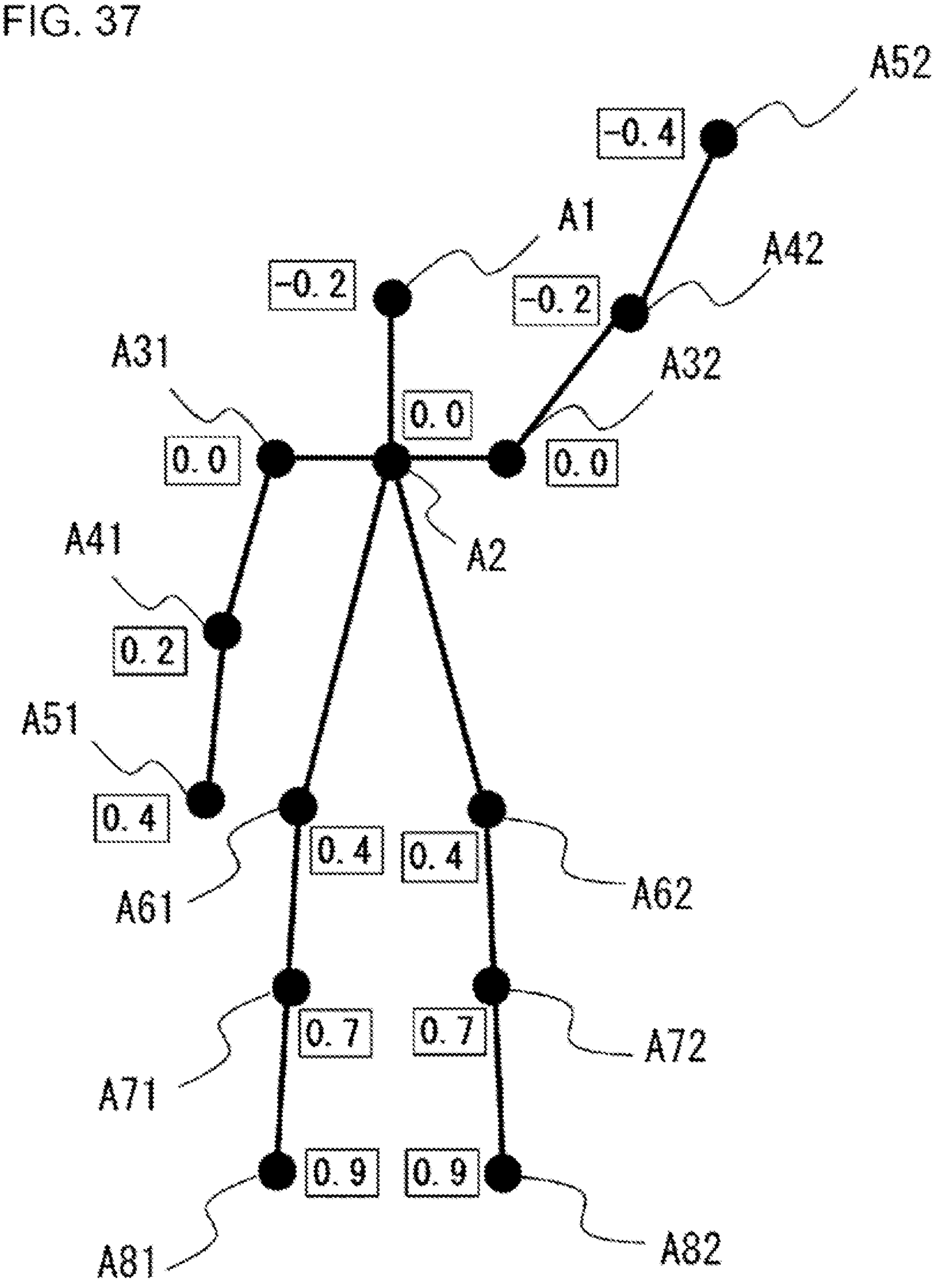
FIG. 37 is a diagram for describing the normalization method according to the example embodiment 2.
Figure 38:
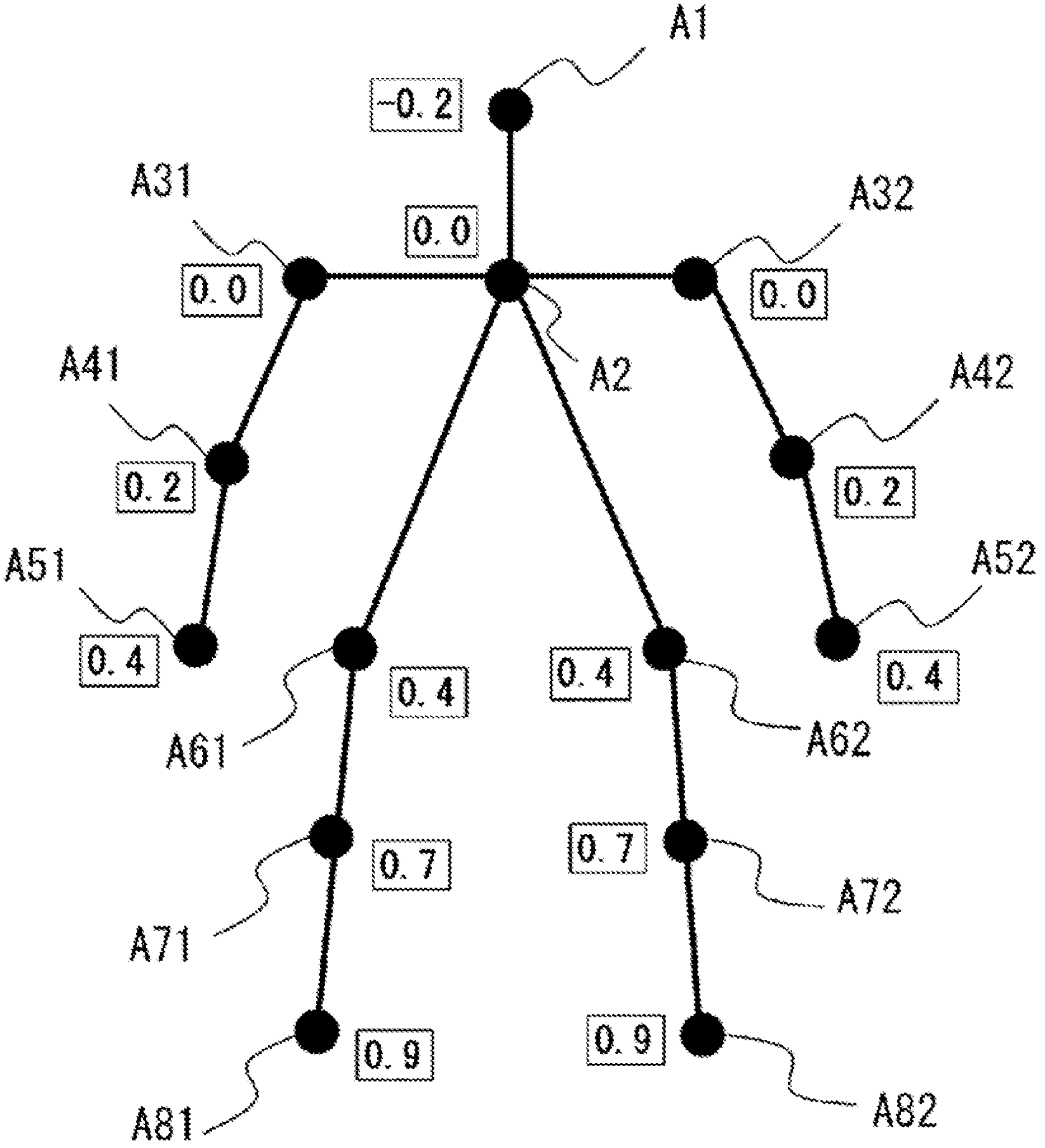
FIG. 38 is a diagram for describing the normalization method according to the example embodiment 2.

FIG. 36 illustrates an example of a feature value of each keypoint acquired by the feature value computation unit 103. In this example, since the keypoint A2 of the neck is the reference point, a feature value of the keypoint A2 is 0.0, and a feature value of a keypoint A31 of a right shoulder and a keypoint A32 of a left shoulder at the same height as the neck is also 0.0. A feature value of a keypoint A1 of a head higher than the neck is −0.2. A feature value of a keypoint A51 of a right hand and a keypoint A52 of a left hand lower than the neck is 0.4, and a feature value of the keypoint A81 of the right foot and the keypoint A82 of the left foot is 0.9. When the person raises the left hand from this state, the left hand becomes higher than the reference point as in FIG. 37, and thus a feature value of the keypoint A52 of the left hand becomes −0.4. Meanwhile, since normalization is performed by using only a coordinate of the Y-axis, as in FIG. 38, a feature value does not change as compared to FIG. 36 even when a width of the skeleton structure changes. In other words, a feature value (normalization value) according to the present example embodiment indicates a feature of a skeleton structure (keypoint) in the height direction (Y direction), and is not affected by a change of the skeleton structure in the horizontal direction (X direction).

As described above, in the present example embodiment, a skeleton structure of a person is detected from a two-dimensional image, and each keypoint of the skeleton structure is normalized by using a height pixel number (upright height on a two-dimensional image space) acquired from the detected skeleton structure. Robustness when classification, a search, and the like are performed can be improved by using the normalized feature value. In other words, since a feature value according to the present example embodiment is not affected by a change of a person in the horizontal direction as described above, robustness with respect to a change in an orientation of the person and a body shape of the person is great.

Further, the present example embodiment can be achieved by detecting a skeleton structure of a person by using a skeleton estimation technique such as OpenPose, and thus learning data that learn a pose and the like of a person do not need to be prepared. Further, classification and a search for a pose and the like of a person can be achieved by normalizing a keypoint of a skeleton structure and storing the keypoint in a database, and thus classification and a search can also be performed on an unknown pose. Furthermore, a clear and simple feature value can be acquired by normalizing a keypoint of a skeleton structure, and thus persuasion of a user for a processing result is high unlike a black-box type algorithm as in machine learning.

While the example embodiments of the present invention have been described above with reference to the drawings, the example embodiments are only exemplifications of the present invention, and various configurations other than the above can also be adopted.

Further, in a plurality of flowcharts used in the above description, a plurality of steps (pieces of processing) are described in order, but an execution order of the steps executed in each example embodiment is not limited to the described order. In each example embodiment, an order of the illustrated steps can be changed within a range that does not interfere with the contents. Further, each example embodiment described above can be combined within a range in which the contents do not conflict with each other.

Some or all of the above-described example embodiments may also be described in supplementary notes below, but is not limited thereto.

1. An image processing apparatus including:
   - an image acquisition unit that acquires a query image, based on an input keyword;
   - a skeleton structure detection unit that detects a two-dimensional skeleton structure of a person included in the query image;

a feature value computation unit that computes a feature value of the detected two-dimensional skeleton structure; and a search unit that searches, based on a degree of similarity of the computed feature value, for an analysis target image including a person in a state similar to a state of a person included in the query image from the analysis target image.

2. The image processing apparatus according to supplementary note 1, wherein the image acquisition unit searches a storage unit for storing a keyword and an image in association with each other, based on the input keyword, and extracts the query image from an image included in a search result.

3. The image processing apparatus according to supplementary note 2, wherein the keyword is associated with a part of the analysis target image, and the image acquisition unit searches for the analysis target image being associated with the keyword, based on the input keyword, and extracts the query image from the analysis target image included in a search result.

4. The image processing apparatus according to supplementary note 1, wherein the image acquisition unit transmits the input keyword to a search engine, acquires a search result from the search engine, and extracts the query image from an image included in the search result.

5. The image processing apparatus according to any one of supplementary notes 2 to 4, wherein the image acquisition unit outputs an image included in the search result, accepts a user input for selecting at least one of images included in the search result, and extracts the selected image as the query image.

6. The image processing apparatus according to supplementary note 5, wherein the image acquisition unit determines at least one of a number of persons and a size of a person in an image included in the search result, and outputs a plurality of images included in the search result in an output order determined based on a result of the determination.

7. The image processing apparatus according to any one of supplementary notes 1 to 6, wherein the image acquisition unit extracts a related word related to the input keyword, based on a related word dictionary, and acquires the query image, based on the related word.

8. The image processing apparatus according to supplementary note 7, wherein the related word dictionary indicates relevance of a plurality of keywords in a hierarchical structure, and the image acquisition unit sets a keyword located under the input keyword as the related word.

9. An image processing method including, by a computer:

acquiring a query image, based on an input keyword;

detecting a two-dimensional skeleton structure of a person included in the query image;

computing a feature value of the detected two-dimensional skeleton structure; and searching, based on a degree of similarity of the computed feature value, for an analysis target image including a person in a state similar to a state of a person included in the query image from the analysis target image.

10. A program causing a computer to function as:

an image acquisition unit that acquires a query image, based on an input keyword;

a skeleton structure detection unit that detects a two-dimensional skeleton structure of a person included in the query image;

a feature value computation unit that computes a feature value of the detected two-dimensional skeleton structure; and a search unit that searches, based on a degree of similarity of the computed feature value, for an analysis target image including a person in a state similar to a state of a person included in the query image from the analysis target image.

REFERENCE SIGNS LIST

1 Image processing system
10 Image processing apparatus
11 Skeleton detection unit
12 Feature value computation unit
13 Recognition unit
100 Image processing apparatus
101 Image acquisition unit
102 Skeleton structure detection unit
103 Feature value computation unit
104 Classification unit
105 Search unit
106 Input unit
107 Display unit
108 Height computation unit
110 Database
200 Camera
300, 301 Human model
401 Two-dimensional skeleton structure
402 Three-dimensional human model

What is claimed is:

1. An image processing apparatus comprising:

at least one memory configured to store one or more instructions; and at least one processor configured to execute the one or more instructions to:

acquire a query image, based on an input keyword;

detect a two-dimensional skeleton structure of a person included in the query image;

compute a feature value of the detected two-dimensional skeleton structure; and search, based on a degree of similarity of the computed feature value, for a target image from a plurality of analysis target images, the target image including a person in a state similar to a state of the person included in the query image, wherein the processor is further configured to execute the one or more instructions to, in the process of the acquiring the query image based on the input keyword:

acquire images using the input keyword, determine a first image among the acquired images, the first image satisfying a condition about at least one of a number of persons in the image and a size of a person in the image, and acquire, as the query image, the determined first image.

2. The image processing apparatus according to claim 1, wherein the processor is further configured to execute the one or more instructions to search a storage unit for a keyword and an image in association with each other, based on the input keyword, and extract the query image from an image included in a search result.

3. The image processing apparatus according to claim 2, wherein the keyword is associated with a part of the target image, and the processor is further configured to execute the one or more instructions to search for the target image being associated with the keyword, based on the input keyword, and extract the query image from the target image included in a search result.

4. The image processing apparatus according to claim 1, wherein the processor is further configured to execute the one or more instructions to transmit the input keyword to a search engine, acquire a search result from the search engine, and extract the query image from an image included in the search result.

5. The image processing apparatus according to claim 2, wherein the processor is further configured to execute the one or more instructions to:

output the image included in the search result, accept a user input for selecting at least one of images included in the search result, and extract the selected image as the query image.

6. The image processing apparatus according to claim 1, wherein the processor is further configured to execute the one or more instructions to extract a related word related to the input keyword, based on a related word dictionary, and acquire the query image, based on the related word.

7. The image processing apparatus according to claim 6, wherein the related word dictionary indicates relevance of a plurality of keywords in a hierarchical structure, and the processor is further configured to execute the one or more instructions to set a keyword located under the input keyword as the related word.

8. An image processing method comprising, by a computer:

acquiring a query image, based on an input keyword;

detecting a two-dimensional skeleton structure of a person included in the query image;

computing a feature value of the detected two-dimensional skeleton structure; and searching, based on a degree of similarity of the computed feature value, for a target image from a plurality of analysis target images, the target image including a person in a state similar to a state of the person included in the query image, wherein the acquiring the query image, based on the input keyword, comprises:

acquiring images using the input keyword, determining a first image among the acquired images, the first image satisfying a condition about at least one of a number of persons in the image and a size of a person in the image, and acquiring, as the query image, the determined first image.

9. A non-transitory storage medium storing a program causing a computer to:

acquire a query image, based on an input keyword;

detect a two-dimensional skeleton structure of a person included in the query image;

compute a feature value of the detected two-dimensional skeleton structure; and search, based on a degree of similarity of the computed feature value, for a target image from a plurality of analysis target images, the target image including a person in a state similar to a state of the person included in the query image, wherein the program is further causing a computer to, in the process of the acquiring the query image based on the input keyword:

acquire images using the input keyword, determine a first image among the acquired images, the first image satisfying a condition about at least one of a number of persons in the image and a size of a person in the image, and acquire, as the query image, the determined first image.

10. The image processing apparatus according to claim 1, wherein the processor is further configured to execute the one or more instructions to:

control to output an image acquired based on the input keyword; and accept a user input for selecting the image as the query image.

11. The image processing apparatus according to claim 1, wherein the processor is further configured to execute the one or more instructions to:

control to output a plurality of images acquired based on the input keyword; and accept a user input for selecting at least one of the plurality of images, as the query image.

12. The image processing apparatus according to claim 1, wherein the processor is further configured to execute the one or more instructions to:

in a process of the acquiring the query image based on the input keyword, accept a user input of a first keyword indicating a state of a person, determine a word of a subordinate concept of the first keyword, based on a dictionary data showing a word of a subordinate concept of a plurality of words indicating a state of a person, output the determined word, accept a user input to select a word among the determined word, and acquire the query image using the selected word as the input keyword.

* * * * *